United States Patent
Sato

(10) Patent No.: US 8,923,642 B2
(45) Date of Patent: Dec. 30, 2014

(54) IMAGE PROCESSING DEVICE AND METHOD

(75) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 13/637,240

(22) PCT Filed: Mar. 31, 2011

(86) PCT No.: PCT/JP2011/058276
§ 371 (c)(1),
(2), (4) Date: Sep. 25, 2012

(87) PCT Pub. No.: WO2011/125867
PCT Pub. Date: Oct. 13, 2011

(65) Prior Publication Data
US 2013/0022281 A1 Jan. 24, 2013

(30) Foreign Application Priority Data

Apr. 9, 2010 (JP) ................. 2010-090718

(51) Int. Cl.
*G06K 9/00* (2006.01)
*G06K 9/48* (2006.01)
*G06K 9/40* (2006.01)
*H04N 19/14* (2014.01)
*H04N 19/117* (2014.01)
*H04N 19/172* (2014.01)
*H04N 19/61* (2014.01)
*H04N 19/82* (2014.01)

(52) U.S. Cl.
CPC ... *H04N 19/00157* (2013.01); *H04N 19/00066* (2013.01); *H04N 19/00266* (2013.01); *H04N 19/00781* (2013.01); *H04N 19/00896* (2013.01)
USPC ............................ 382/252; 382/199; 382/260

(58) Field of Classification Search
None
See application file for complete search history.

(56) References Cited

U.S. PATENT DOCUMENTS

| 5,550,640 A | * | 8/1996 | Tsuboi et al. | ............. 386/314 |
| 2006/0268990 A1 | * | 11/2006 | Lin et al. | ............. 375/240.24 |

(Continued)

FOREIGN PATENT DOCUMENTS

| JP | 2006-32999 A | 2/2006 |
| JP | 2010-81368 A | 4/2010 |

(Continued)

OTHER PUBLICATIONS

Japanese Office Action issued Oct. 15, 2013 in Patent Application No. 2010-090718.

(Continued)

*Primary Examiner* — Bhavesh Mehta
*Assistant Examiner* — David F Dunphy
(74) *Attorney, Agent, or Firm* — Oblon, Spivak, McClelland, Maier & Neustadt, L.L.P.

(57) ABSTRACT

An adaptive loop filter classifies a decoded image from a deblocking filter into a smooth region class and an edge/texture region class, in accordance with results of edge detection from an edge detecting unit. The adaptive loop filter performs filter coefficient calculation for each of classified classes such that the residual difference between an original image from a screen rearranging buffer and an image from the deblocking filter is smallest. The adaptive loop filter performs filter processing using filter coefficients calculated for each classified class, and outputs an image after filter processing to frame memory. The filter may be applied to an image encoding device for performing encoding with the H.264/AVC format as a basis, for example.

13 Claims, 24 Drawing Sheets

(56) References Cited

U.S. PATENT DOCUMENTS

| | | |
|---|---|---|
| 2008/0267297 A1 | 10/2008 | Sampedro et al. |
| 2009/0262800 A1* | 10/2009 | Zhang et al. ............... 375/240.2 |
| 2010/0021071 A1 | 1/2010 | Wittmann et al. |
| 2010/0254463 A1 | 10/2010 | Narroschke et al. |
| 2011/0081087 A1* | 4/2011 | Moore ......................... 382/199 |
| 2011/0110427 A1* | 5/2011 | Teng et al. ............... 375/240.16 |
| 2011/0200238 A1* | 8/2011 | Garud et al. .................. 382/128 |

FOREIGN PATENT DOCUMENTS

| | | |
|---|---|---|
| WO | 2008 075247 | 6/2008 |
| WO | 2008 084745 | 7/2008 |
| WO | 2008 134482 | 11/2008 |
| WO | 2009 110559 | 9/2009 |
| WO | 2010 026770 | 3/2010 |

OTHER PUBLICATIONS

Hao-Song Kong et al., "Edge Map Guided Adaptive Post-Filter for Blocking and Ringing Artifacts Removal", Proceedings of the 2004 International Symposium on Circuits and Systems (ISCAS '04), IEEE, vol. 3, 2004, pp. III-929-932.

U.S. Appl. No. 13/638,944, filed Oct. 2, 2012, Sato.

International Search Report Issued Jul. 12, 2011 in PCT/JP11/058276 Filed Mar. 31, 2011.

* cited by examiner

FIG. 6

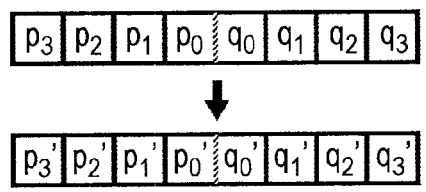

FIG. 7

| | |
|---|---|
| ONE OF p OR q BELONGS TO AN INTRA MACROBLOCK, AND ALSO IS SITUATED AT A BOUNDARY OF THE MACROBLOCK. | Bs = 4 (Strongest Filtering) |
| ONE OF p OR q BELONGS TO AN INTRA MACROBLOCK, BUT IS NOT SITUATED AT A BOUNDARY OF THE MACROBLOCK. | Bs = 3 |
| NEITHER p NOR q BELONG TO AN INTRA MACROBLOCK, AND ALSO ONE HAS A TRANSFORM COEFFICIENT. | Bs = 2 |
| NEITHER p NOR q BELONGS TO AN INTRA MACROBLOCK, NOR DOES EITHER HAVE A TRANSFORM COEFFICIENT; BUT THE REFERENCE FRAMES DIFFER, OR THE NUMBER OF REFERENCE FRAMES DIFFER, OR THE mv VALUE DIFFERS. | Bs = 1 |
| NEITHER p NOR q BELONGS TO AN INTRA MACROBLOCK, NOR DOES EITHER HAVE A TRANSFORM COEFFICIENT, AND THE REFERENCE FRAMES AND mv VALUE ARE THE SAME. | Bs = 0 (No Filtering) |

FIG. 8

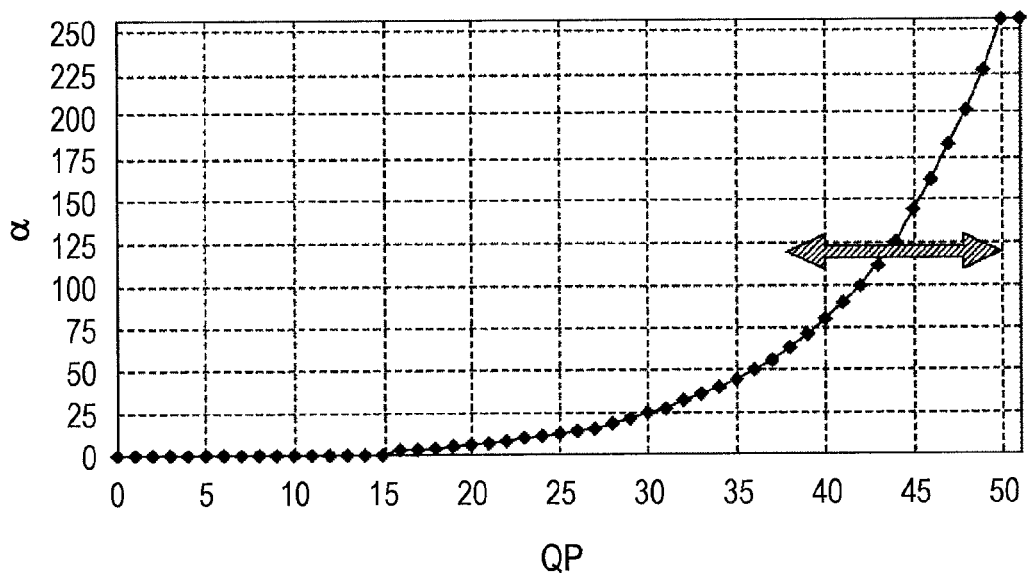

| indexA (for α) or indexB (for β) | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

B

| indexA (for α) or indexB (for β) | | | | | | | | | | | | | | | | | | | | | | | | | | |
|---|---|---|---|---|---|---|---|---|---|---|---|---|---|---|---|---|---|---|---|---|---|---|---|---|---|---|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

| indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bs=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bs=2 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |
| bs=3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

B

| indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bs=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bs=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bs=3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

IMAGE PROCESSING DEVICE AND METHOD

TECHNICAL FIELD

The present invention relates to an image processing device and method, and specifically relates to an image processing device and method which improves encoding efficiency and improves subjective image quality in decoded images.

BACKGROUND ART

In recent years, there have come into widespread use devices which subject an image to compression encoding by employing an encoding format handling image information as digital, and at this time compress the image by orthogonal transform such as discrete cosine transform or the like and motion compensation, taking advantage of redundancy peculiar to the image information, in order to perform highly effective information transmission and storage at that time. Examples of this encoding method include MPEG (Moving Picture Expert Group) and so forth.

In particular, MPEG2 (ISO/IEC 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. Also, by employing the MPEG2 compression format, a code amount (bit rate) of 18 through 22 Mbps is allocated in the event of an interlaced scanning image of high resolution having 1920×1088 pixels, for example. Thus, a high compression rate and excellent image quality can be realized.

With MPEG2, high image quality encoding adapted to broadcasting usage is principally taken as an object, but a lower code amount (bit rate) than the code amount of MPEG1, i.e., an encoding format having a higher compression rate is not handled. According to spread of personal digital assistants, it has been expected that needs for such an encoding format will be increased from now on, and in response to this, standardization of the MPEG4 encoding format has been performed. With regard to an image encoding format, the specification thereof was confirmed as an international standard as ISO/IEC 14496-2 in December in 1998.

Further, in recent years, standardization of a standard called H.26L (ITU-T Q6/16 VCEG) has progressed, originally intended for image encoding for videoconferencing usage. With H.26L, it has been known that as compared to a conventional encoding format such as MPEG2 or MPEG4, though greater computation amount is required for encoding and decoding thereof, higher encoding efficiency is realized. Thereafter, as part of activity of MPEG4, standardization for also taking advantage of functions not supported by H.26L with this H.26L taken as a base, to realize higher encoding efficiency, has been performed as Joint Model of Enhanced-Compression Video Coding. As a schedule of standardization, H.264 and MPEG-4 Part 10 (Advanced Video Coding, hereafter, referred to as H.264/AVC) become an international standard in March, 2003.

FIG. 1 is a block diagram illustrating a configuration example of an image encoding device with a compressed image based on H.264/AVC as output.

With the example in FIG. 1, the image encoding device 1 has an A/D conversion unit 11, a screen rearranging buffer 12, a computing unit 13, an orthogonal transform unit 14, a quantization unit 15, a lossless encoding unit 16, and a storage buffer 17, an inverse quantization unit 18, an inverse orthogonal transform unit 19, a computing unit 20, a deblocking filter 21, frame memory 22, a switch 23, an intra prediction unit 24, a motion prediction/compensation unit 25, a prediction image selecting unit 26, and a rate control unit 27.

The A/D conversion unit 11 performs A/D conversion of an input image, and outputs to the screen rearranging buffer 12 and stores. The screen rearranging buffer 12 rearranges the images of frames in the stored order for display into the order of frames for encoding according to GOP (Group of Picture).

The computing unit 13 subtracts, from the image read out from the screen rearranging buffer 12, the prediction image from the intra prediction unit 24 or the prediction image from the motion prediction/compensation unit 25, selected by the prediction image selecting unit 26, and outputs difference information thereof to the orthogonal transform unit 14. The orthogonal transform unit 14 subjects the difference information from the computing unit 13 to orthogonal transform, such as discrete cosine transform, Karhunen-Loéve transform, or the like, and outputs a transform coefficient thereof. The quantization unit 15 quantizes the transform coefficient that the orthogonal transform unit 14 outputs.

The quantized transform coefficient serving as the output of the quantization unit 15 is input to the lossless encoding unit 16, and subjected to lossless encoding, such as variable length coding, arithmetic coding, or the like, and thus compressed.

The lossless encoding unit 16 obtains information indicating intra prediction from the intra prediction unit 24, and obtains information indicating an inter prediction mode, and so forth from the motion prediction/compensation unit 25. Note that the information indicating intra prediction and the information indicating inter prediction will also be referred to as intra prediction mode information and inter prediction mode information, respectively, hereinafter.

The lossless encoding unit 16 encodes the quantized transform coefficient, and also encodes the information indicating intra prediction, information indicating inter prediction mode, and so forth, and takes these as part of header information in a compressed image. The lossless encoding unit 16 supplies the encoded data to the storage buffer 17 for storing.

For example, with the lossless encoding unit 16, lossless encoding processing, such as variable length coding, arithmetic coding, or the like, is performed. Examples of the variable length coding include CAVLC (Context-Adaptive Variable Length Coding) stipulated by the H.264/AVC format. Examples of the arithmetic coding include CABAC (Context-Adaptive Binary Arithmetic Coding).

The storage buffer 17 outputs the data supplied from the lossless encoding unit 16 to a decoding side, for example, such as a recording device or transmission path or the like downstream not shown in the drawing, as a compressed image encoded by the H.264/AVC format.

Also, the quantized transform coefficient output from the quantization unit 15 is also input to the inverse quantization unit 18, inversely quantized, and then further subjected to inverse orthogonal transform at the inverse orthogonal transform unit 19. The output subjected to inverse orthogonal transform is added to the prediction image supplied from the prediction image selecting unit 26 by the computing unit 20, and becomes a locally decoded image. The deblocking filter 21 removes block noise of the decoded image, and then supplies to the frame memory 22 for storing. An image prior to being subjected to deblocking filter processing by the deblocking filter 21 is also supplied to the frame memory 22 for storing.

The switch 23 outputs a reference image stored in the frame memory 22 to the motion prediction/compensation unit 25 or intra prediction unit 24.

With this image encoding device 1, for example, the I picture, B picture, and P picture from the screen rearranging buffer 12 are supplied to the intra prediction unit 24 as an image to be subjected to intra prediction (also referred to as intra processing). Also, the B picture and P picture read out from the screen rearranging buffer 12 are supplied to the motion prediction/compensation unit 25 as an image subjected to inter prediction (also referred to as inter processing).

The intra prediction unit 24 performs intra prediction processing of all of the candidate intra prediction modes based on the image to be subjected to intra prediction read out from the screen rearranging buffer 12, and the reference image supplied from the frame memory 22, to generate a prediction image.

At that time, the intra prediction unit 24 calculates a cost function value as to all of the candidate intra prediction modes, and selects an intra prediction mode wherein the calculated cost function value provides the minimum value, as the optimal intra prediction mode.

The intra prediction unit 24 supplies the prediction image generated in the optimal intra prediction mode, and the cost function value thereof to the prediction image selecting unit 26. In the event that the prediction image generated in the optimal intra prediction mode has been selected by the prediction image selecting unit 26, the intra prediction unit 24 supplies information indicating the optimal intra prediction mode to the lossless encoding unit 16. The lossless encoding unit 16 encodes this information, and takes this as part of the header information in the compressed image.

The image subjected to inter processing read out from the screen rearranging buffer 12, and the reference image are supplied from the frame memory 22 to the motion prediction/compensation unit 25 via the switch 23. The motion prediction/compensation unit 25 performs motion prediction of a block in all of the candidate inter prediction modes to generate the motion vector of each block.

The motion prediction/compensation unit 25 uses the predicted motion vector of each block to calculate a cost function value as to all of the candidate inter prediction modes. The motion prediction/compensation unit 25 determines, of the calculated cost function values, the prediction mode of a block that provides the minimum value as the optimal inter prediction mode.

The motion prediction/compensation unit 25 supplies the prediction image of a block to be processed of the determined optimal inter prediction mode, and the cost function value thereof to the prediction image selecting unit 26. In the event that the prediction image of the block to be processed of the optimal inter prediction mode has been selected by the prediction image selecting unit 26, the motion prediction/compensation unit 25 outputs information indicating the optimal inter prediction mode (inter prediction mode information) to the lossless encoding unit 16.

At this time, the motion vector information, reference frame information, and so forth are also output to the lossless encoding unit 16. The lossless encoding unit 16 also subjects the information from the motion prediction/compensation unit 25 to lossless encoding processing such as variable length coding, arithmetic coding, or the like, and inserts into the header portion of the compressed image.

The prediction image selecting unit 26 determines the optimal prediction mode out of the optimal intra prediction mode and optimal inter prediction mode based on each cost function value output from the intra prediction unit 24 or motion prediction/compensation unit 25. The prediction image selecting unit 26 then selects the prediction image of the determined optimal prediction mode, and supplies to the computing units 13 and 20. At this time, the prediction image selecting unit 26 supplies selection information of the prediction image to the intra prediction unit 24 or motion prediction/compensation unit 25.

The rate control unit 27 controls a rate of the quantization operation of the quantization unit 15 based on the compressed image stored in the storage buffer 17 so as not to cause overflow nor underflow.

FIG. 2 is a block diagram illustrating a configuration example of an image decoding device corresponding to the image encoding device in FIG. 1.

With the example in FIG. 2, the image decoding device 31 is configured of a storage buffer 41, a lossless decoding unit 42, an inverse quantization unit 43, an inverse orthogonal transform unit 44, a computing unit 45, a deblocking filter 46, a screen rearranging buffer 47, a D/A conversion unit 48, frame memory 49, a switch 50, an intra prediction unit 51, a motion compensation unit 52, and a switch 53.

The storage buffer 41 stores the transmitted compressed image. The lossless decoding unit 42 decodes information encoded by the lossless encoding unit 16 in FIG. 1 supplied from the storage buffer 41 with a format corresponding to the encoding format of the lossless encoding unit 16. The inverse quantization unit 43 inversely quantizes the image decoded by the lossless decoding unit 42 with a format corresponding to the quantization format of the quantization unit 15 in FIG. 1. The inverse orthogonal transform unit 44 subjects to inverse orthogonal transform the output of the inverse quantization unit 43 with a format corresponding to the orthogonal transform format of the orthogonal transform unit 14 in FIG. 1.

The output subjected to inverse orthogonal transform is added to the prediction image supplied from the switch 53 from the computing unit 45 and decoded. The deblocking filter 46 removes block noise of the decoded image, then supplies to the frame memory 49 for storing, and also outputs to the screen rearranging buffer 47.

The screen rearranging buffer 47 performs rearranging of images. Specifically, the order of frames rearranged for encoding order by the screen rearranging buffer 12 in FIG. 1 is rearranged into the original display order. The D/A conversion unit 48 subjects the image supplied from the screen rearranging buffer 47 to D/A conversion, output to an unshown display for display.

The switch 50 reads out an image to be subjected to inter processing, and an image to be referenced from the frame memory 49, outputs to the motion compensation unit 52, and also reads out an image to be subjected to intra prediction from the frame memory 49, and supplies to the intra prediction unit 51.

Information indicating the intra prediction mode obtained by decoding the header information is supplied from the lossless decoding unit 42 to the intra prediction unit 51. The intra prediction unit 51 generates a prediction image based on this information, and outputs the generated prediction image to the switch 53.

Of the information obtained by decoding the header information, the inter prediction mode information, motion vector information, reference frame information, and so forth are supplied from the lossless decoding unit 42 to the motion compensation unit 52. The inter prediction mode information is transmitted for each macroblock. The motion vector information and reference frame information is transmitted for each block to be processed.

The motion compensation unit 52 uses the motion vector information, reference frame information, and so forth supplied from the lossless decoding unit 42 in the prediction mode that the inter prediction mode information supplied for the lossless decoding unit 42 indicates to generate pixel values of the prediction image corresponding to the block to be processed. The generated pixel values of the prediction image are supplied to the computing unit 45 via the switch 53.

The switch 53 selects the prediction image generated by the motion compensation unit 52 or intra prediction unit 51, and supplies to the computing unit 45.

Further, as an extension of this H.264/AVC, standardization of FRExt (Fidelity Range Extension) including a coding tool necessary for business use such as RGB, 4:2:2, or 4:4:4, 8×8DCT and quantization matrix stipulated by MPEG-2 has been completed in February in 2005. Thus, H.264/AVC can be used as an encoding format capable of suitably expressing even film noise included in movies, and has come to be employed for wide ranging applications such as Blu-Ray Disc (registered trademark) and so forth.

However, nowadays, needs for further high-compression encoding have been increased, such as intending to compress an image having around 4000×2000 pixels, which is quadruple of a high-vision image, or alternatively, needs for further high-compression encoding have been increased, such as intending to distribute a high-vision image within an environment with limited transmission capacity like the Internet. Therefore, with the above-mentioned VCEG (=Video Coding Expert Group) under the control of ITU-T, studies relating to improvement of encoding efficiency have continuously been performed.

As a technique for improving such encoding efficiency, a technique called an adaptive loop filter (ALF (Adaptive Loop Filter)) has been proposed in NPL 1.

FIG. 3 is a block diagram illustrating a configuration example of an image encoding device to which an adaptive loop filter has been applied. Note that, with the example in FIG. 3, for convenience of description, the A/D conversion unit 11, screen rearranging buffer 12, storage buffer 17, switch 23, intra prediction unit 24, prediction image selecting unit 26, and rate control unit 27 in FIG. 1 are omitted. Also, an arrow and so forth are also omitted. Accordingly, in the case of the example in FIG. 3, the reference image from the frame memory 22 is directly input to the motion prediction/compensation unit 25, and the prediction image from the motion prediction/compensation unit 25 is directly output to the computing units 13 and 20.

Specifically, the image encoding device 61 in FIG. 3 differs from the image encoding device 1 in FIG. 1 only in that an adaptive loop filter 71 is added between the deblocking filter 21 and frame memory 22.

The adaptive loop filter 71 perform calculation of an adaptive loop filter coefficient so as to minimize residual error with the original image from the screen rearranging buffer 12 (drawing is omitted), and uses this adaptive loop filter coefficient to perform filter processing on the decoded image from the deblocking filter 21. As for this filter, a Wiener filter (Wiener Filter) is employed, for example.

Also, the adaptive loop filter 71 transmits the calculated adaptive loop filter coefficient to the lossless encoding unit 16. The lossless encoding unit 16 performs lossless encoding processing such as variable length coding, arithmetic coding, or the like on this adaptive loop filter coefficient, and inserts into the header portion of the compressed image.

FIG. 4 is a block diagram illustrating a configuration example of an image decoding device corresponding to the image encoding device in FIG. 3. Note that, with the example in FIG. 4, for convenience of description, the storage buffer 41, screen rearranging buffer 47, D/A conversion unit 48, switch 50, intra prediction unit 51, and switch 53 in FIG. 2 are omitted. Also, an arrow and so forth are also omitted. Accordingly, in the case of the example in FIG. 4, the reference image from the frame memory 49 is directly input to the motion compensation unit 52, and the prediction image from the motion compensation unit 52 is directly output to the computing unit 45.

Specifically, the image decoding device 81 in FIG. 4 differs from the image decoding device 31 in FIG. 2 only in that an adaptive loop filter 91 is added between the deblocking filter 46 and frame memory 49.

An adaptive loop filter coefficient decoded at the lossless decoding unit 42 and extracted from the header is supplied to the adaptive loop filter 91. The adaptive loop filter 91 uses the supplied filter coefficient to perform filter processing on the decoded image from the deblocking filter 46. As for this filter, a wiener filter is employed, for example.

Thus, the image quality of a decoded image can be improved, and further the image quality of a reference image can also be improved.

Now, with the above H.264/AVC format, the macroblock size is 16×16 pixels. However, the macroblock size of 16×16 pixels is not optimal for large image frames such as UHD (Ultra High Definition; 4000×2000 pixels) which will be handled by next-generation encoding formats.

Therefore, with NPL 2 and so forth, there has been proposed enlarging the macroblock size to a size of such as 32×32 pixels, for example.

Note that, though NPL 2 is a proposal wherein an extended macroblock is applied to inter-slice, there has been a proposal in NPL 3 wherein an extended macroblock is applied to intra-slice.

CITATION LIST

Patent Literature

NPL 1: Takeshi. Chujoh, et al., "Block-based Adaptive Loop Filter" ITU-T SG16 Q6 VCEG Contribution, AI18, Germany, July, 2008
NPL 2: "Video Coding Using Extended Block Sizes", VCEG-AD09, ITU-Telecommunications Standardization Sector STUDY GROUP Question 16—Contribution 123, January 2009
NPL 3: "Intra Coding Using Extended Block Sizes", VCEG-AL28, July, 2009

SUMMARY OF INVENTION

Technical Problem

Incidentally, with the method proposed in NPL 1, filtering processing is performed to optimize the prediction efficiency of the overall screen, so removal of block noise has been difficult.

Particularly, with the H.264/AVC format, a deblocking filter is held within the motion prediction/compensation loop as a part of the configuration of the image encoding device and image decoding device, but it is difficult to remove mosquito noise which readily occurs at regions including edges and texture.

In the event that extended macroblocks such as described in NPL 2 or 3 are introduced and the orthogonal transform size increases, the difficulty thereof becomes even more marked.

The present invention has been made in the light of such a situation, and encoding efficiency can be improved, and subjective image quality in decoded images improved.

Solution to Problem

An image processing device according to one aspect of the present invention includes: classifying means configured to perform class classification of an image into a smooth region class and an edge or texture class, for each predetermined block, using baseband information of pixel values configuring the predetermined block; and filter processing means configured to perform filter processing as to the predetermined blocks subjected to class classification by the classifying means, using filter coefficients calculated using the predetermined blocks class-classified into same classes.

The classifying means may perform class classification of the image into the smooth region class and the edge or texture class using edge information of the predetermined blocks as the baseband information, for each of the predetermined blocks.

The edge information of the predetermined blocks is information indicating edge strength.

The edge strength of the predetermined block is calculated using a Sobel operator.

In the event that the edge strength of the predetermined block exceeds a predetermined threshold value, the classifying means may perform class classification of the predetermined block into the edge or texture class, and in the event that the edge strength of the predetermined block does not exceed the predetermined threshold value, perform class classification of the image into the smooth region class.

The predetermined block may be a block or a block making up the block, the image processing device further including threshold value deciding means configured to decide the predetermined threshold value in accordance with a quantization parameter in the block.

The threshold value deciding means may decide the predetermined threshold value to be a value lower than a higher quantization parameter.

The predetermined block may be a block or a block making up the block, the image processing device further including threshold value deciding means configured to decide the predetermined threshold value in accordance with whether or not the frame in which the block is included has been subjected to deblocking filtering.

In the event that the frame in which the block is included has been subjected to deblocking filtering, the threshold value deciding means may decide the predetermined threshold value to be a value lower than a case in which this has not been subjected to deblocking filtering.

The classifying means may perform class classification of the image into the smooth region class and the edge or texture class using pixel dispersion values of the predetermined blocks as the baseband information, for each of the predetermined blocks.

In the event that the pixel dispersion value of the predetermined block exceeds a predetermined threshold value, the classifying means may perform class classification of the predetermined block into the edge or texture class, and in the event that the pixel dispersion value of the predetermined block does not exceed a predetermined threshold value, perform class classification into the smooth region class.

The predetermined block may be a block or a block making up the block, the image processing device further including threshold value deciding means configured to decide the predetermined threshold value in accordance with a quantization parameter in the block.

The threshold value deciding means may decide the predetermined threshold value to be a value lower than a higher quantization parameter.

The predetermined block may be a block or a block making up the block, the image processing device further including threshold value deciding means configured to decide the predetermined threshold value in accordance with whether or not the frame in which the block is included has been subjected to deblocking filtering.

In the event that the frame has been subjected to deblocking filtering, the threshold value deciding means may decide the predetermined threshold value to be a value lower than a case in which this has not been subjected to deblocking filtering.

The image processing device may further include filter coefficient calculating means configured to calculate the filter coefficient using the predetermined blocks class-classified into the same classes.

The image processing device may further include transmitting means configured to transmit a bit stream of the image, and filter coefficients calculated by the filter coefficient calculating means.

The image processing device may further include receiving means configured to receive a bit stream of the image, and the filter coefficients.

According to an aspect of the present invention, with an image processing method of an image processing device including classifying means and filter processing means, the classifying means perform class classification of an image into a smooth region class and an edge or texture class, for each predetermined block, using baseband information of pixel values configuring the predetermined block, and the filter processing means perform filter processing as to the predetermined blocks subjected to class classification, using filter coefficients calculated using the predetermined blocks class-classified into same classes.

According to one aspect of the present invention, class classification is performed of an image into a smooth region class and an edge or texture class, for each predetermined block, using baseband information of pixel values configuring the predetermined block. Filter processing is then performed as to the predetermined blocks subjected to class classification, using filter coefficients calculated using the predetermined blocks class-classified into same classes.

Note that the above image processing device may be a standalone device or internal block making up one image encoding device or image decoding device.

Advantageous Effects of Invention

According to the present invention, encoding efficiency can be improved, and subjective image quality in decoded images can be improved.

BRIEF DESCRIPTION OF DRAWINGS

FIG. 6 is a diagram for describing an operating principle of a deblocking filter.

FIG. 7 is a diagram for describing a method of defining Bs.

FIG. 8 is a diagram for describing an operating principle of a deblocking filter.

FIG. 9 is a diagram illustrating an example of correlation between indexA and indexB, and the values of α and β.

FIG. 10 is a diagram illustrating an example of correlation between Bs, indexA, and tCO.

DESCRIPTION OF EMBODIMENTS

Hereinafter, embodiments of the present invention will be described with reference to the drawings.
[Configuration Example of Image Encoding Device]

Figure 5:
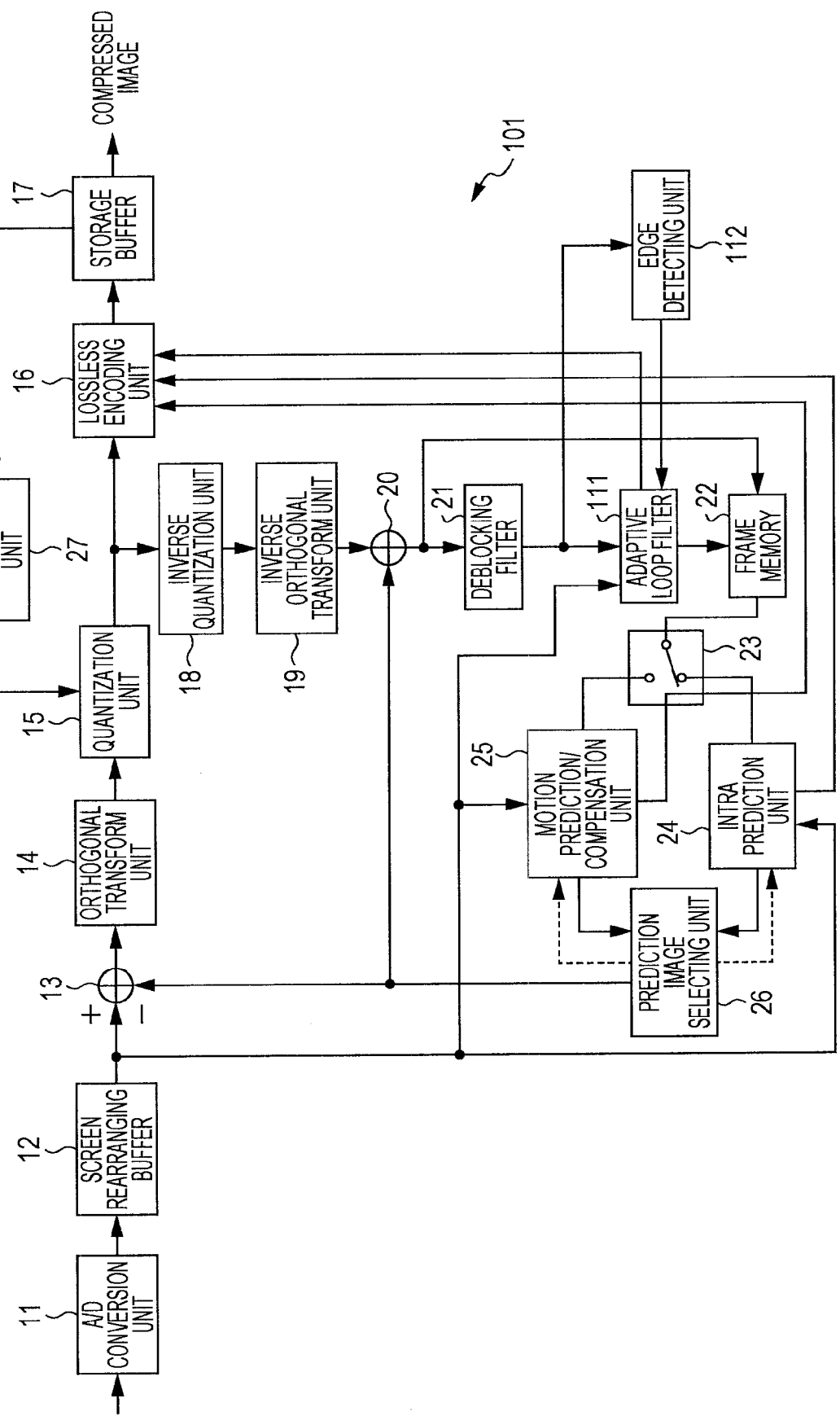
FIG. 5 is a block diagram illustrating the configuration of an embodiment of an image encoding device to which the present invention has been applied.

FIG. 5 represents the configuration of an embodiment of an image encoding device serving as an image processing device to which the present invention has been applied.

Figure 1:
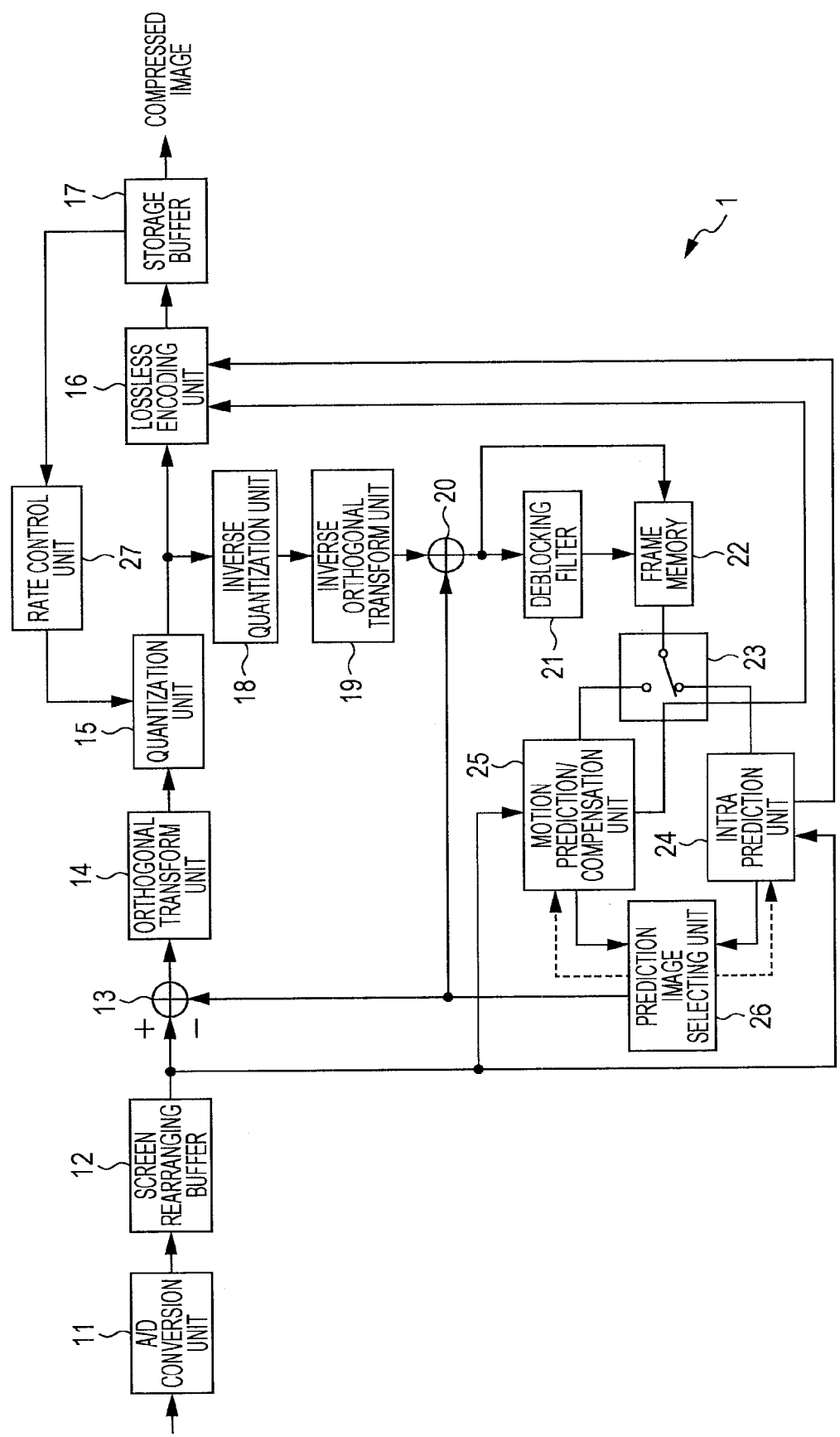
FIG. 1 is a block diagram illustrating a configuration example of an image encoding device employing the H.264/AVC format.

An image encoding device 101 in FIG. 5 is the same as the image encoding device 1 in FIG. 1 in that there are provided the A/D conversion unit 11, screen rearranging buffer 12, computing unit 13, orthogonal transform unit 14, quantization unit 15, lossless encoding unit 16, storage buffer 17, inverse quantization unit 18, inverse orthogonal transform unit 19, computing unit 20, deblocking filter 21, frame memory 22, switch 23, intra prediction unit 24, motion prediction/compensation unit 25, prediction image selecting unit 26, and rate control unit 27.

Also, the image encoding device 101 in FIG. 5 differs from the image encoding device 1 in FIG. 1 in that an adaptive loop filter 111 and a edge detecting unit 112 are added.

That is to say, the adaptive loop filter 111 and edge detecting unit 112 are provided after the deblocking filter 21 and before the frame memory 22. That is to say, the adaptive loop filter 111 and edge detecting unit 112 are provided within a motion compensation loop made up of the computing unit 13, orthogonal transform unit 14, quantization unit 15, inverse quantization unit 18, inverse orthogonal transform unit 19, computing unit 20, deblocking filter 21, frame memory 22, switch 23, intra prediction unit 24 or motion prediction/compensation unit 25, and prediction image selecting unit 26. That is to say, an image is used being looped within the motion compensation loop.

The adaptive loop filter 111 classifies decoded images from the deblocking filter 21 (baseband information after local decoding) into classes according to the baseband information thereof. Specifically, the decoded images from the deblocking filter 21 are classified into classes in accordance with the information obtained from the baseband information, i.e., edge information detected by the edge detecting unit 112, as the baseband information thereof.

The adaptive loop filter 111 performs calculation of filter coefficients for each classified class, such that the residual difference between the original image from the screen rearranging buffer 12 and the image from the deblocking filter 21 is the smallest. The adaptive loop filter 111 uses calculated filter coefficients for each of the classified classes to perform filter processing, and outputs images after filtering processing to the frame memory 22. As for this filter, a Wiener filter (Wiener Filter) is employed, for example.

Figure 3:
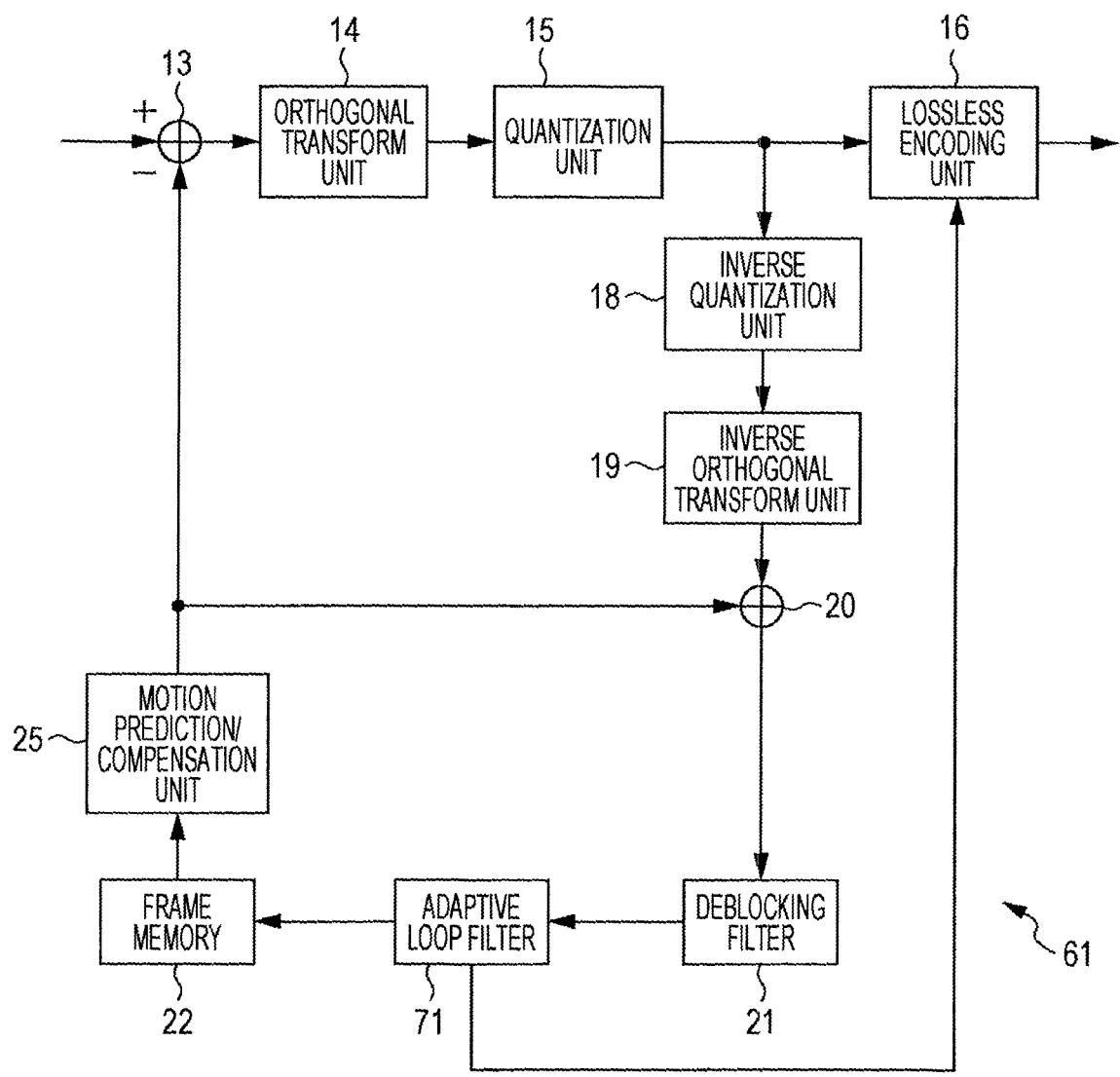
FIG. 3 is a block diagram illustrating a configuration example of am image encoding device to which an adaptive loop filter has been applied.
Figure 4:
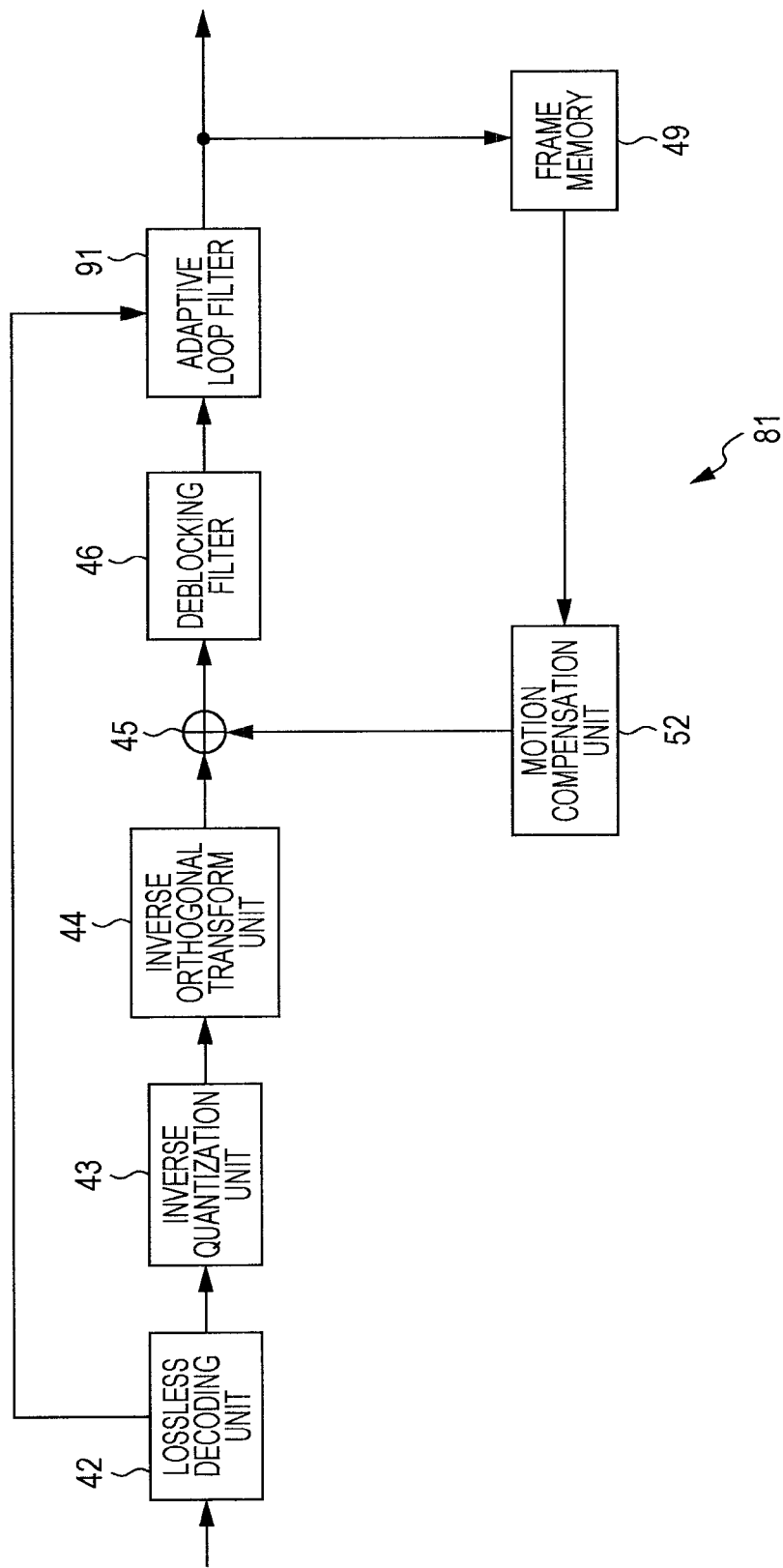
FIG. 4 is a block diagram illustrating a configuration example of am image decoding device to which an adaptive loop filter has been applied.

Also, the adaptive loop filter 111 transmits the calculated filter coefficients to the lossless encoding unit 16. Note that at this time, the lossless encoding unit 16 encodes the filter coefficients calculated by the adaptive loop filter 111 as well, so as to be inserted into the compressed image slice header portion or picture parameter set, as shown in the case in FIG. 3.

The edge detecting unit 112 detects edges from the decoded image from the deblocking filter 21 (i.e., baseband information after local decoding), and supplies edge information which is the results of having detected edges, to the adaptive loop filter 111.

Note that with the example in FIG. 5, an example is illustrated where the decoded images from the deblocking filter 21 are directly input to the edge detecting unit 112, but a configuration may be made where the decoded images from the deblocking filter 21 are temporarily stored in the frame memory 22, with these being input to the edge detecting unit 112.
[Deblocking Filter]

Next, the above-described processes will be described in detail. First, the deblocking filter will be described. The deblocking filter 21 is included in the motion compensation loop, and removes block noise in decoded images. Accordingly, propagation of block noise to the image referenced by motion compensation processing is suppressed.

The following three methods of (a) through (c) for deblocking filter processing can be selected by the two parameters of deblocking_filter_control_present_flag included in Picture Parameter Set RBSP (Raw Byte Sequence Payload) and disable_deblocking_filter_idc included in the slice header (Slice Header), which are included in the encoded data.

(a) applied to block boundaries and macroblock boundaries (b) applied to just macroblock boundaries (c) not applied As for a quantization parameter QP, QPY is used in the case of applying the following processing to luminance signals, and QPC is used in the case of applying to color difference signals. Also, while pixel values belonging to different slices are processed as being "not available" in motion vector encoding, intra prediction, and entropy encoding (CAVLC/CABAC), with deblocking filter processing even pixel values belonging to different slices are processed as being "available" as long as they belong to the same picture.

In the following we will say that the pixel values before deblocking filter processing are p0 through p3 and q0 through q3, and the pixel values after the processing are p0' through p3' and q0' through q3', as shown in FIG. 6.

First, prior to the deblocking filter processing, Bs (Boundary Strength) is defined for p and q in FIG. 6, as with the table shown in FIG. 7.

The (p2, p1, p0, q0, q1, q2) in FIG. 6 is subjected to deblocking filter processing only in the event that the conditions shown in the following Expression (1) and Expression (2) hold.

$$Bs > 0 \quad (1)$$

$$|p0-q0|<\alpha; |p1-p0|<\beta; |q1-q1|<\beta \quad (2)$$

In the default state, α and β in Expression (2) have the values thereof determined in accordance with QP as shown below, but the user can adjust the intensities thereof as indicated by the arrows in the graph in FIG. 8, by the two parameters called slice_alpha_c0_offset_div2 and slice_beta_offset_div2 which are included in the slice header of the encoded data.

As shown in the table in FIG. 9, α is obtained from indexA. In the same way, β is obtained from indexB. These indexA and indexB are defined as with the following Expression (3) through Expression (5).

$$qP_{av}=(qP_p+qP_q+1)>>1 \quad (3)$$

$$\text{index}A=\text{Clip3}(0,51,qP_{av}+\text{FilterOffset}A) \quad (4)$$

$$\text{index}B=\text{Clip3}(0,51,qP_{av}+\text{FilterOffset}B) \quad (5)$$

In Expression (4) and Expression (5), FilterOffsetA and FilterOffsetB correspond to the amount of adjustment by the user.

With deblocking filter processing, mutually different methods are defined for the case of Bs<4 and the case of Bs=4, as will be described below. In the case of Bs<4, the pixel values p'0 and q'0 after deblocking filter processing are obtained as with the following Expression (6) through Expression (8).

$$\Delta=\text{Clip3}(-t_c,t_c,((((q0-p0)<<2)+(p1-q1)+4)>>3)) \quad (6)$$

$$p'0=\text{Clip1}(p0+\Delta) \quad (7)$$

$$q'0=\text{Clip1}(q0+\Delta) \quad (8)$$

Now, $t_c$ is calculated as with Expression (9) or Expression (10) below. That is to say, in the event that the value of chromaEdgeFlag is "0", $t_c$ is calculated as with the following Expression (9).

$$t_c=t_{c0}+((a_p<\beta)?1:0)+((a_p<\beta)?1:0) \quad (9)$$

Also, in the event that the value of chromaEdgeFlag is other than "0", $t_c$ is calculated as with the following Expression (10).

$$t_c=t_{c0}+1 \quad (10)$$

The value of $t_{c0}$ is defined as in the table shown in A in FIG. 10 and B in FIG. 10, in accordance with Bs and the value of indexA.

Also, the values of $a_p$ and $a_q$ in Expression (9) are calculated as with the following Expressions (11) and (12).

$$a_p=|p2-p0| \quad (11)$$

$$a_q=|q2-q0| \quad (12)$$

The pixel value p'1 following deblocking filter processing is obtained as follows. That is to say, in the event that the value of chromaEdgeFlag is "0" and also the value of $a_p$ is equal to or smaller than β, p'1 is obtained as with the following Expression (13).

$$p'1=p1+\text{Clip3}(-t_{c0},t_{c0},(p2+((p0+q0+1)>>1)-(p1<<1))>>1) \quad (13)$$

Also, in the event that Expression (13) does not hold, p'1 is obtained as with the following Expression (14).

$$p'1=p1 \quad (14)$$

The pixel value q'1 following deblocking filter processing is obtained as follows. Specifically, in the event that the value of chromaEdgeFlag is "0" and also the value of $a_q$ is equal to or smaller than β, q'1 is obtained as with the following Expression (15).

$$q'1=q1+\text{Clip3}(-t_{c0},t_{c0},(q2+((p0+q0+1)>>1)-(q1<<1))>>1) \quad (15)$$

Also, in the event that Expression (15) does not hold, q'1 is obtained as with the following Expression (16).

$$q'1=q1 \quad (16)$$

The values of p'2 and q'2 are unchanged from the values of p2 and q2 before Filtering. Specifically, p'2 is obtained as with the following Expression (17), and q'2 is obtained as with the following Expression (18).

$$p'2=p2 \quad (17)$$

$$q'2=q2 \quad (18)$$

In the case of Bs=4, the pixel values p'i (i=0 . . . 2) following deblocking filtering are obtained as follows. In the event that the value of chromaEdgeFlag is "0" and the conditions shown in the following Expression (19) hold, p'0, p'1, and p'2 are obtained as with the following Expression (20) through Expression (22).

$$ap<\beta\&\&|p0-q0|<((\alpha>>2)+2) \quad (19)$$

$$p'0=(p2+2\times p1+2\times p0+2\times q0+q1+4)>>3 \quad (20)$$

$$p'1=(p2+p1+p0+q0+2)>>2 \quad (21)$$

$$p'2=(2\times p3+3\times p2+p1+p0+q0+4)>>3 \quad (22)$$

Also, in the event that the conditions shown in Expression (19) do not hold, p'0, p'1, and p'2 are obtained as with the following Expressions (23) through (25).

$$p'0=(2 \times p1+p0+q1+2)>>2 \quad (23)$$

$$p'1=p1 \quad (24)$$

$$p'2=p2 \quad (25)$$

The pixel values q'i (I=0 ... 2) following deblocking filter processing are obtained as follows. That is, in the event that the value of chromaEdgeFlag is "0" and the conditions shown in the following Expression (26) hold, q'0, q'1, and q'2 are obtained as with the following Expressions (27) through (29).

$$aq<\beta \&\& |p0-q0|<((\alpha>>2)+2) \quad (26)$$

$$q'0=(p1+2 \times p0+2 \times q0+2 \times q1+q2+4)>>3 \quad (27)$$

$$q'1=(p0+q0+q1+q2+2)>>2 \quad (28)$$

$$q'2=(2 \times q3+3 \times q2+q1+q0+p4+4)>>3 \quad (29)$$

Also, in the event that the conditions shown in Expression (26) do not hold, q'0, q'1, and q'2 are obtained as with the following Expressions (30) through (32).

$$q'0=(2 \times q1+q0+p1+2)>>2 \quad (30)$$

$$q'1=q1 \quad (31)$$

$$q'2=q2 \quad (32)$$

[Example of Extended Macroblocks]

Also, making the macroblock size to be 16 pixels×16 pixels is not optimal for large image frames such as UHD (Ultra High Definition; 4000 pixels×2000 pixels) which serves the object of next-generation encoding formats. With the image encoding device 101, as illustrated in FIG. 11, it may be employed to make the macroblock size a size, for example, such as 32 pixels×32 pixels or 64×64 pixels.

Figure 11:
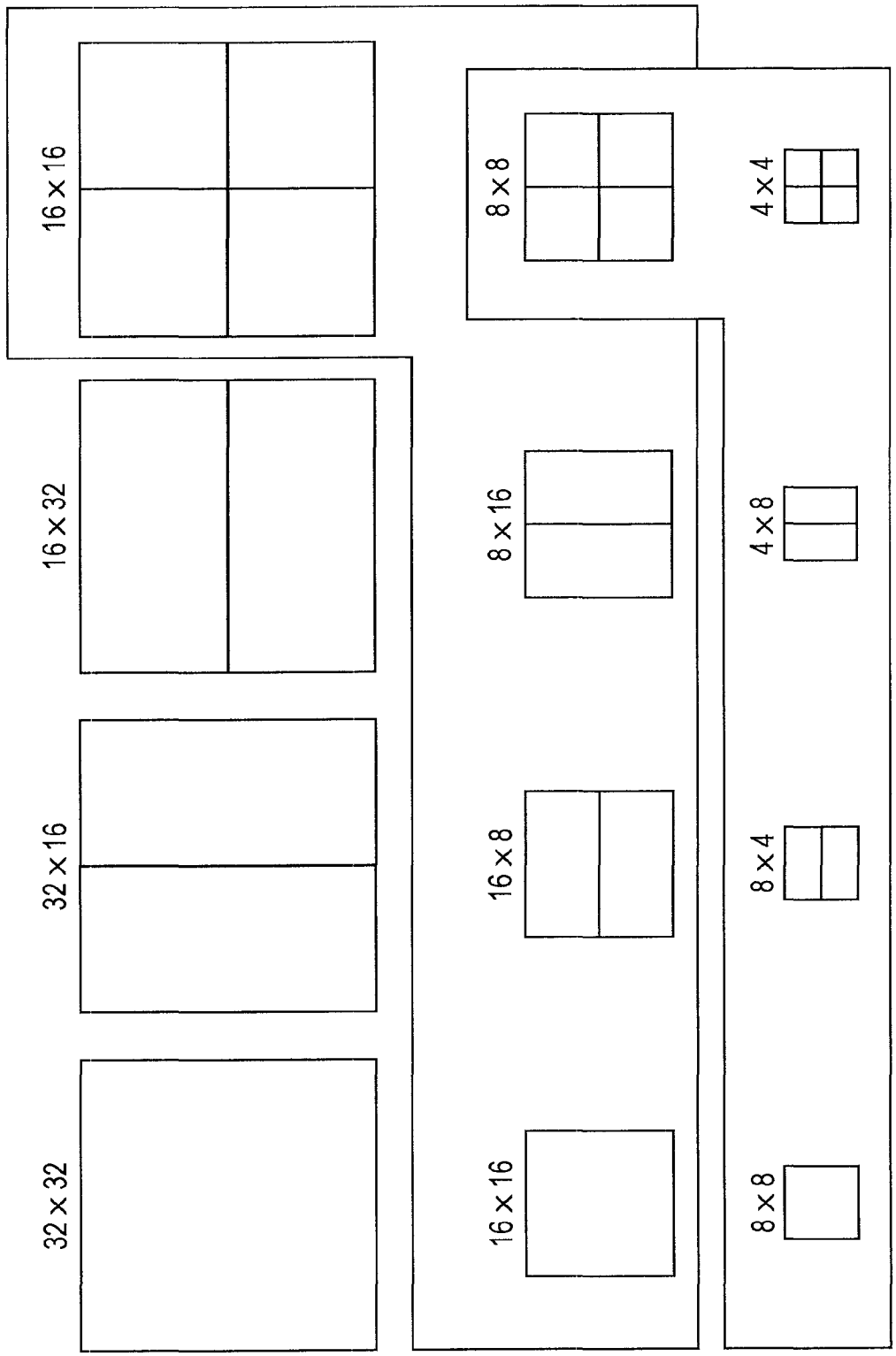
FIG. 11 is a diagram illustrating an example of macroblocks.

FIG. 11 is a diagram illustrating an example of a block size proposed in NPL 2. With NPL 2, the macroblock size is extended to 32×32 pixels.

With the upper tier in FIG. 11, macroblocks made up of 32×32 pixels divided into blocks (partitions) of 32×32 pixels, 32×16 pixels, 16×32 pixels, and 16×16 pixels are indicated in order from the left. With the middle tier in FIG. 11, blocks made up of 16×16 pixels divided into blocks of 16×16 pixels, 16×8 pixels, 8×16 pixels, and 8×8 pixels are indicated in order from the left. Also, with the lower tier in FIG. 11, blocks made up of 8×8 pixels divided into blocks of 8×8 pixels, 8×4 pixels, 4×8 pixels, and 4×4 pixels are indicated in order from the left.

That is to say, with the macroblock of 32×32 pixels, processing with blocks of 32×32 pixels, 32×16 pixels, 16×32 pixels, and 16×16 pixels indicated in the upper tier in FIG. 11 can be performed.

With the block of 16×16 pixels indicated on the right side in the upper tier, in the same way as with the H.264/AVC format, processing with blocks of 16×16 pixels, 16×8 pixels, 8×16 pixels, and 8×8 pixels indicated in the middle tier can be performed.

With the block of 8×8 pixels indicated on the right side in the middle tier, in the same way as with the H.264/AVC format, processing with blocks of 8×8 pixels, 8×4 pixels, 4×8 pixels, and 4×4 pixels indicated in the lower tier can be performed.

These blocks can be classified into the following three hierarchies. Specifically, the blocks of 32×32 pixels, 32×16 pixels, and 16×32 pixels indicated in the upper tier in FIG. 11 will be referred to as a first hierarchy. The block of 16×16 pixels indicated on the right side in the upper tier, and the blocks of 16×16 pixels, 16×8 pixels, 8×16 pixels indicated in the middle tier will be referred to as a second hierarchy. The block of 8×8 pixels indicated on the right side in the middle tier, and the blocks of 8×8 pixels, 8×4 pixels, 4×8 pixels, and 4×4 pixels indicated in the lower tier will be referred to as a third hierarchy.

A hierarchical structure such as FIG. 11 is employed, and accordingly, as for blocks equal to or smaller than the block of 16×16 pixels, while maintaining compatibility with the macroblocks in the current AVC, greater blocks are defined as supersets thereof.

[Selection of Prediction Mode]

Further, in order to achieve even higher encoding efficiency, selecting an appropriate prediction mode is important. For example, with the image encoding device 101, a method for selecting two mode determining methods of a High Complexity Mode and a Low Complexity Mode can be conceived. In the case of this method, with either, cost function values relating to each prediction mode Mode are calculated, and the prediction mode which makes this the smallest is selected as the optional mode for the current block or macroblock.

The cost function value with the High Complexity Mode can be obtained as with the following Expression (33).

$$\text{Cost(Mode} \in \Omega)=D+\lambda \times R \quad (33)$$

In the Expression (33), $\Omega$ is the whole set of candidate modes for encoding the current block or macroblock. Also, D is difference energy between the decoded image and input image in the case of encoding with the current prediction mode Mode. Further, $\lambda$ is a Lagrange multiplier given as a function of a quantization parameter. Also, R is the total code amount in the case of encoding with the current mode Mode, including orthogonal transform coefficients.

That is to say, in order to perform encoding with the High Complexity Mode, there is the need to perform tentative encoding processing once by all candidate modes Mode in order to calculate the above parameters D and R, requiring a greater amount of computations.

On the other hand, the cost function value in the Low Complexity Mode can be obtained as shown in the following Expression (34).

$$\text{Cost(Mode} \in \Omega)=D+QP2\text{Quant}(QP) \times \text{HeaderBit} \quad (34)$$

holds. In Expression (34), D is the difference energy between the prediction image and input image, unlike the case of the High Complexity Mode. Also, QP2Quant (QP) is given as a function of a quantization parameter QP. Further, HeaderBit is the code amount relating to information belonging to the Header not including orthogonal transform coefficients, such as motion vectors and mode.

That is to say, in the Low Complexity mode, prediction processing needs to be performed relating to each candidate mode Mode, but there is no need to perform all the way to a decoded image, so there is no need to perform all the way to encoding processing. Accordingly, realization with a smaller amount of computation as compared to the High Complexity Mode is enabled.

With High Profile, selection between 4×4 orthogonal transform and 8×8 orthogonal transform such as shown in FIG. 6 is also performed based on one of the above-described High Complexity Mode and Low Complexity Mode.

[Detailed Configuration Example]

With the above image encoding device 101, adaptive loop filter processing is applied to the image encoding processing. The image encoding device 101 has the adaptive loop filter 111, and classifies locally decoded images into classes in accordance with the baseband information of the images, and performs adaptive filter coefficient calculation and filter processing as to each of the class-classified classes.

For example, edge information, obtained from images locally decoded by the edge detecting unit 112 provided along with the adaptive loop filter 111 within the motion prediction/compensation loop, is used.

The following is a detailed description of the configuration of the adaptive loop filter 111 and the edge detecting unit 112. At the adaptive loop filter 111, adaptive filter processing within the motion compensation loop is performed in accordance with the method proposed in NPL 1.

Note however, that with NPL 1, processing is performed wherein deterioration is minimized by a Wiener filter, with the entire screen as a single class.

As opposed to this, with the adaptive loop filter 111, class classification is performed where the entire screen is classified into a smooth region class including smooth portions, and an edge/texture region class including edges or texture. Processing is then performed wherein deterioration is minimized by a Wiener filter, for each of the classes.

That is to say, decoding processing (local decoding processing) is performed, and the decoded image which has been subjected to deblocking filter processing is input to not only the adaptive loop filter 111 but also the edge detecting unit 112.

At the edge detecting unit 112, the Sobel Operator shown in the following Expression (35) for example, is applied to each pixel of the decoded image.

[Math. 1]

$$Sobel_x = \begin{bmatrix} -1 & 0 & 1 \\ -2 & 0 & 2 \\ -1 & 0 & 1 \end{bmatrix}$$
$$Sobel_y = \begin{bmatrix} -1 & -2 & -1 \\ 0 & 0 & 0 \\ 1 & 2 & 1 \end{bmatrix}$$
(35)

With the total of the results of Expression (35) as $g_{HS}$ and $g_{VS}$ respectively, the edge strength at each pixel is calculated for each pixel as with the following Expression (36).

[Math. 2]

$$g = \sqrt{g_{HS}^2 + g_{VS}^2}$$
(36)

The total of the edge strength of each pixel calculated by Expression (36) for the current block or the current macroblock is taken as the edge strength edge_strength of the current block or the current macroblock.

The adaptive loop filter 111 the compares this edge strength edge_strength and a predetermined threshold value $\Theta$, and in the event that the following Expression (37) holds, the current block or the current macroblock is determined to be an edge/texture region. In the event that Expression (37) does not hold, the current block or the current macroblock is determined to be a smooth region.

$$edge\_strength > \Theta$$
(37)

That is to say, in the event that the edge strength is greater than the threshold value $\Theta$, the current block or current macroblock is determined to be an edge/texture region, and in the event that the edge strength is equal to or smaller than the threshold value $\Theta$, the current block or current macroblock is determined to be a smooth region.

The adaptive loop filter 111 performs adaptive filter coefficient calculation and filter processing on each class of the smooth region class and the edge/texture region class.

Note that the threshold value $\Theta$ may be given as a function of a quantization parameter QP. That is to say, when the bit rate is low, i.e., when the quantization parameter is high, the high-frequency component (edge information) of the input image is readily lost due to quantization distortion, and also due to the deblocking filter being more readily applied. Loss of this high-frequency component can be avoided and suppressed by setting a lower threshold value $\Theta$ for a higher QP.

Also, with the H.264/AVC format, the user can set control of whether to apply or to not apply the deblocking filter, by operating an unshown operation input unit, but an arrangement may be made where the threshold value $\Theta$ is set in accordance with presence/absence of the deblocking filter (applied/not applied). That is to say, a case where the deblocking filter is applied increases the probability that low-pass filter processing is being performed on each of the frame, as compared with a case of the deblocking filter not being applied, so the probability of edge information also being lost is high. Accordingly, there is the need to set the threshold value $\Theta$ of the latter to a smaller value as compared to the case of the former.

Block noise readily occurs as to flat regions (regions of smooth portions) within the screen, and mosquito noise readily occurs as to regions including edges and texture. However, with the method proposed in NPL 1, even though deterioration of the overall image could be minimized, improvement of image deterioration unique to each of the smooth region and edge/texture region has been difficult.

Accordingly, with the adaptive loop filter 111, class classification is performed in accordance with the decoded image (baseband information), and filter coefficient calculation and adaptive filter processing is performed as to each class.

That is to say, within the image is divided into smooth regions and edge/texture regions, and adaptive filter processing is performed as to each.

Accordingly, improvement in image quality deterioration unique to each of smooth regions and edge/texture regions each be realized.

Note that since the block distortion in smooth regions and mosquito noise in edge/texture regions are reduced, the distortion of the overall image is reduced as a result, and necessity of processing by the deblocking filter 21 can be done away with.

Also, the same operation as the above-described edge detection can be performed in a later-described image decoding device 201 as well. That is to say, there is no need to send flag information for class classification (i.e., information for identifying which class) to the decoding side. Accordingly, there is no deterioration of encoding efficiency due to the overhead of flag information.

Further, also, mosquito is not generated simply where edges or texture are included, but in a case where quantization error has occurred in high-frequency component in particular of portions including edges or texture. Simply detecting edges in an input image, performing class classification, and sending flag information for each block or macroblock, is still far from being sufficient for removal of mosquito noise.

Using a decoded image as with the above-described image encoding device 101, and further using encoding information regarding quantization parameters and whether or not the deblocking filter has been applied, enables excellent removal of mosquito noise.

Note that in the above description, an example has been described where edge information is used as baseband information for class classification, but this is not restricted to edge information. For example, an arrangement may be made where dispersion values (activity) of pixel values are calculated for each block or macroblock making up the decoded image, with class classification being performed accordingly. That is to say, dispersion values of pixel values obtained from the baseband information can be used as baseband information.

In this case as well, in the event that the dispersion values of the pixel values are greater than a predetermined threshold value, determination is made that the current block or the current macroblock is an edge/texture region, and in the event that the dispersion values of the pixel values are equal to or smaller than the predetermined threshold value, determination is made that the current block or the current macroblock is a smooth region. In the event of dispersion values as well, the predetermined threshold value is set according to quantization parameters and whether the deblocking filter is on or off, in the same way as with the case of edge information.

Also, in the above description, an example has been described where an edge detection method using a Sobel Operator is the edge detection method, but other edge detection methods may be used, unrestricted to this.

[Configuration Example of Adaptive Loop Filter]

Figure 12:
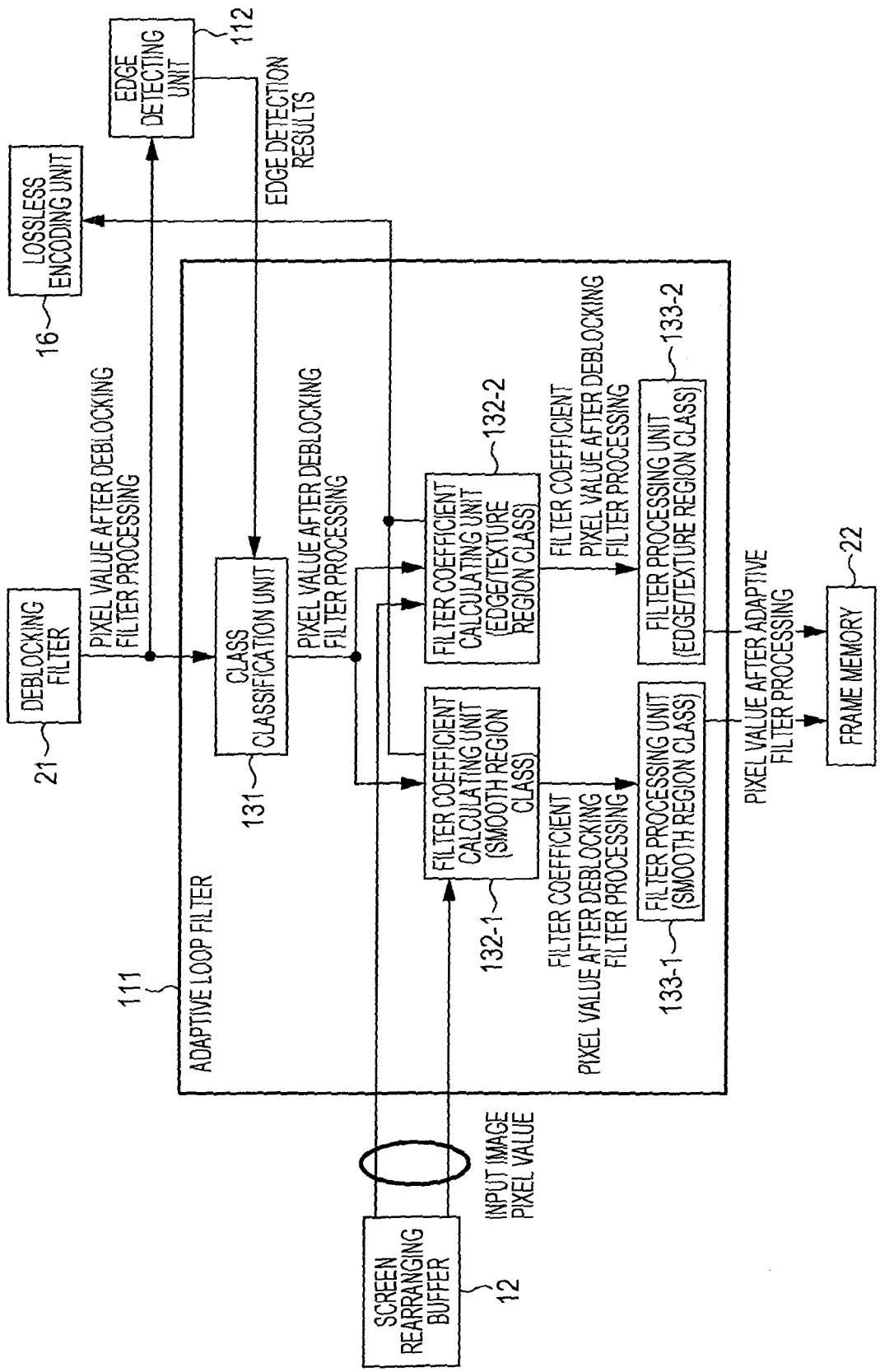
FIG. 12 is a block diagram illustrating a configuration example of the adaptive loop filter in FIG. 5.

FIG. 12 is a block diagram illustrating a configuration example of the adaptive loop filter 111.

In the example in FIG. 12, the adaptive loop filter 111 is configured of a class classification unit 131, filter coefficient calculating units 132-1 and 132-2, and filter processing units 133-1 and 133-2.

Pixel values after deblocking filter processing from the deblocking filter 21 are supplied to the class classification unit 131 and the edge detecting unit 112. Also, edge information which is the results of edge detection, detected using the pixel values after deblocking filter processing, is supplied from the edge detecting unit 112 to the class classification unit 131.

The class classification unit 131 classifies the pixel values of each macroblock (or block) after deblocking filter processing into those belonging to the smooth region class and those belonging to the edge/texture region class, in accordance with the edge information from the edge detecting unit 112. The class classification unit 232 then supplies the pixel values of the classified classes to the filter coefficient calculating units 132-1 and 132-2, respectively.

Input image pixel values are supplied from the screen rearranging buffer 12 to the filter coefficient calculating units 132-1 and 132-2. The filter coefficient calculating units 132-1 and 132-2 each calculate adaptive filter coefficients as to the smooth region class and edge/texture region class.

The filter coefficient for the smooth region class calculated by the filter coefficient calculating unit 132-1 so is supplied to the filter processing unit 133-1 along with the pixel values of the smooth region class after deblocking filter processing. The filter coefficient for the edge/texture region class calculated by the filter coefficient calculating unit 132-2 so is supplied to the filter processing unit 133-2 along with the pixel values of the edge/texture region class after deblocking filter processing. Also, the calculated adaptive filter coefficients for each class are supplied to the lossless encoding unit 16 as well.

The filter processing unit 133-1 performs filter processing on the pixel values of the smooth region class following deblocking filter processing, using the adaptive filter coefficient as to the smooth region class. The filter processing unit 133-2 performs filter processing on the pixel values of the edge/texture region class following deblocking filter processing, using the adaptive filter coefficient as to the edge/texture region class. The pixel values after adaptive filter processing are each output to the frame memory 22.

[Description of Encoding Processing of Image Encoding Device]

Figure 13:
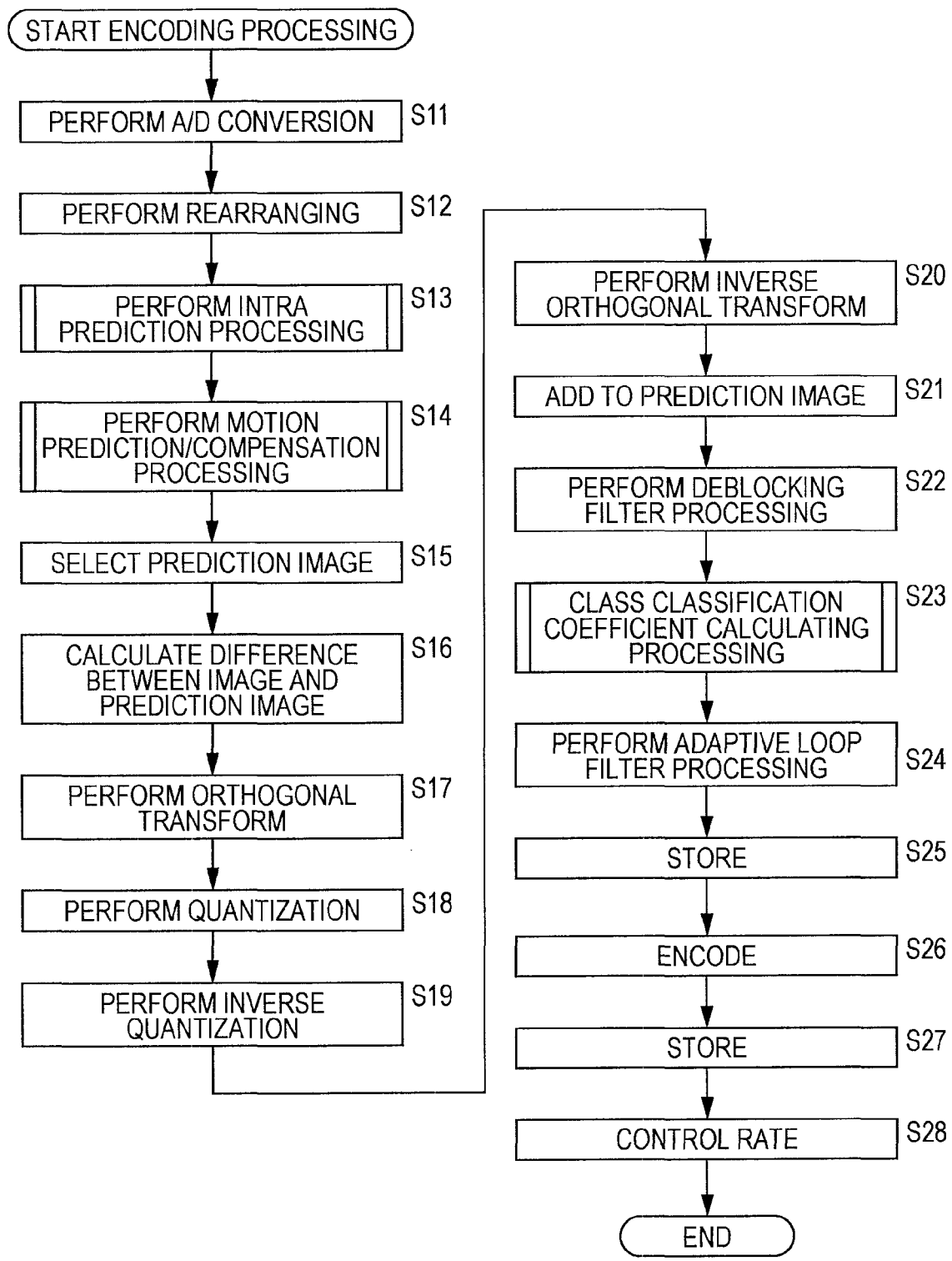
FIG. 13 is a flowchart describing encoding processing of the image encoding device in FIG. 5.

Next, encoding processing of the image encoding device 101 in FIG. 5 will be described with reference to the flowchart in FIG. 13.

In step S11, the A/D conversion unit 11 converts an input image from analog to digital. In step S12, the screen rearranging buffer 12 stores the image supplied from the A/D conversion unit 11, and performs rearranging from the sequence for displaying the pictures to the sequence for encoding.

In the event that the image to be processed, that is supplied from the screen rearranging buffer 12, is an image of a block that is to be intra processed, a decoded image to be referenced is read out from the frame memory 22 and supplied to the intra prediction unit 24 via the switch 23.

Based on these images, in step S13, the intra prediction unit 24 subjects pixels of a block to be processed to intra prediction in all of the candidate intra prediction modes. Note that, as for a decoded pixel to be referenced, a pixel not subjected to filtering by the deblocking filter 21 and adaptive loop filter 111 is employed.

Figure 14:
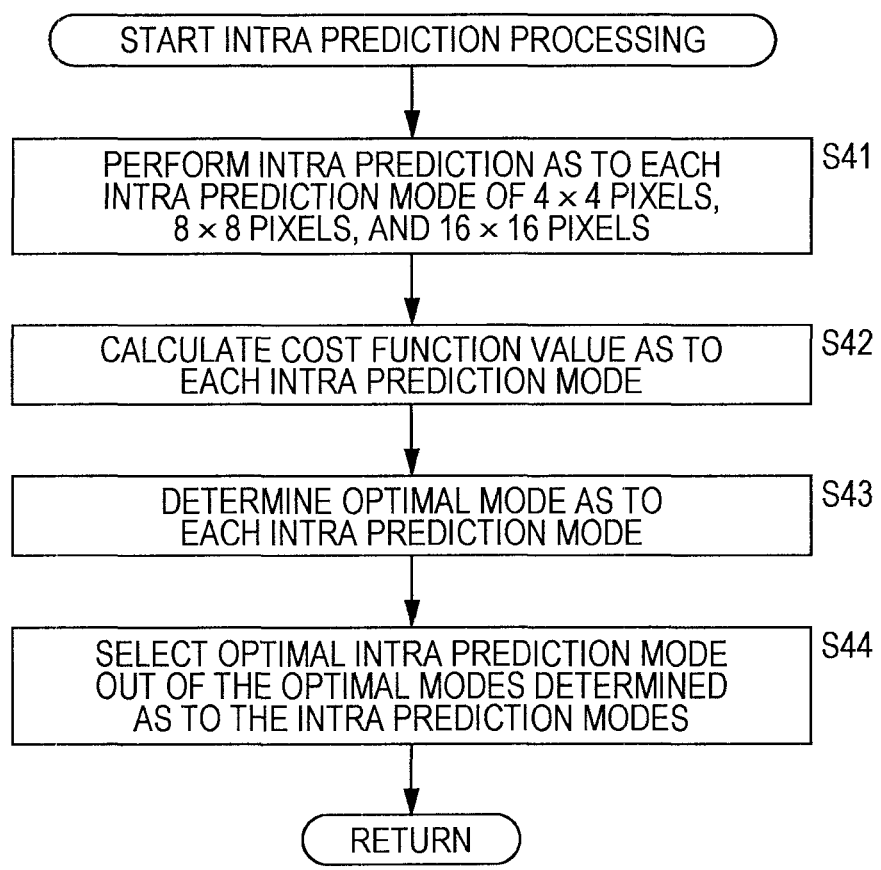
FIG. 14 is a flowchart describing the intra prediction processing in step S13 in FIG. 13.

While the details of the intra prediction processing in step S13 will be described later with reference to FIG. 14, according to this processing, intra prediction is performed in all of the candidate intra prediction modes, and a cost function value is calculated as to all of the candidate intra prediction modes. Based on the calculated cost function values, the optimal intra prediction mode is then selected, the prediction image generated by intra prediction of the optimal intra prediction mode, and the cost function value thereof are supplied to the prediction image selecting unit 26.

In the event that the image to be processed supplied from the screen rearranging buffer 12 is an image to be subjected to inter processing, an image to be referenced is read out from the frame memory 22, and supplied to the motion prediction/compensation unit 25 via the switch 23. Based on these images, in step S14, the motion prediction/compensation unit 25 performs motion prediction/compensation processing.

Figure 15:
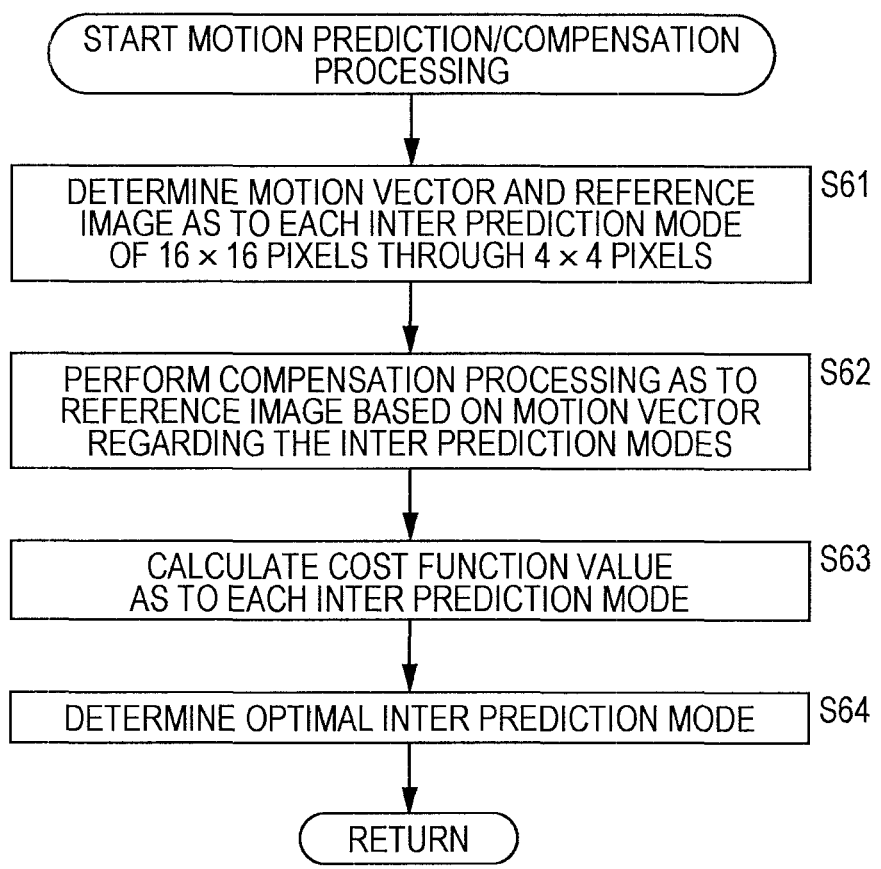
FIG. 15 is a flowchart describing the motion prediction/compensation processing in step S14 in FIG. 13.

The details of the motion prediction/compensation processing in step S14 will be described later with reference to FIG. 15. According to this processing, motion prediction processing is performed in all of the candidate inter prediction modes, a cost function value is calculated as to all of the candidate inter prediction modes, and based on the calculated cost function values, the optimal inter prediction mode is determined. The prediction image generated by the optimal inter prediction mode, and the cost function value thereof are then supplied to the prediction image selecting unit 26.

In step S15, the prediction image selecting unit 26 determines one of the optimal intra prediction mode and the optimal inter prediction mode as the optimal prediction mode based on the cost function values output from the intra prediction unit 24 and motion prediction/compensation unit 25. The prediction image selecting unit 26 then selects the prediction image of the determined optimal prediction mode, and supplies to the computing units 13 and 20. This prediction image is used for the above computations in steps S16 and S21.

Note that selection information of this prediction image is supplied to the intra prediction unit 24 or motion prediction/compensation unit 25. In the event that the prediction image of the optimal intra prediction mode has been selected, the intra prediction unit 24 supplies information indicating the optimal intra prediction mode (i.e., intra prediction mode information) to the lossless encoding unit 16.

In the event that the prediction image of the optimal inter prediction mode has been selected, the motion prediction/compensation unit 25 outputs information indicating the optimal inter prediction mode, and further according to need, information according to the optimal inter prediction mode to the lossless encoding unit 16. Examples of the information according to the optimal inter prediction mode include motion vector information and reference frame information.

In step S16, the computing unit 13 computes difference between an image rearranged in step S12 and the prediction image selected in step S15. The prediction image is supplied to the computing unit 13 from the motion prediction/compensation unit 25 in the event of performing inter prediction, and from the intra prediction unit 24 in the event of performing intra prediction, via the prediction image selecting unit 26, respectively.

The difference data is smaller in the data amount as compared to the original image data. Accordingly, the data amount can be compressed as compared to the case of encoding the original image without change.

In step S17, the orthogonal transform unit 111 subjects the difference information supplied from the computing unit 13 to orthogonal transform. Specifically, orthogonal transform, such as discrete cosine transform, Karhunen-Loéve transform, or the like, is performed, and a transform coefficient is output.

In step S18, the quantization unit 15 quantizes the transform coefficient. At the time of this quantization, the rate is controlled as described with processing in later-described step S28.

The difference information thus quantized is locally decoded as follows. Specifically, in step S19, the inverse quantization unit 18 subjects the transform coefficient quantized by the quantization unit 112 to inverse quantization using a property corresponding to the property of the quantization unit 112. In step S20, the inverse orthogonal transform unit 19 subjects the transform coefficient subjected to inverse quantization by the inverse quantization unit 18 to inverse orthogonal transform using a property corresponding to the property of the orthogonal transform unit 14.

In step S21, the computing unit 20 adds the prediction image input via the prediction image selecting unit 26 to the locally decoded (i.e., locally decoded) difference information, and generates a locally decoded image (the image corresponding to the input to the computing unit 13).

In step S22, the deblocking filter 21 subjects the image output from the computing unit 20 to deblocking filter processing. Thus, block noise is removed. The decoded image from the deblocking filter 21 is output to the adaptive loop filter 111 and edge detecting unit 112.

In step S23, the adaptive loop filter 111 performs class classification coefficient calculation processing. Details of this class classification calculation processing will be described later with reference to FIG. 16. Note that the adaptive loop filter 111 in this case is of the configuration shown in FIG. 12.

Due to the processing of step S23, class classification is performed in accordance to baseband information of the decoded image, i.e., edge information obtained from the baseband information, and adaptive filter coefficients are calculated for the classes. The calculated adaptive filter coefficients are supplied to the filter processing units 133-1 and 133-2 along with the pixel values after deblocking filter processing that have been classified into the classes.

Note that the adaptive filter coefficient information calculated in step S23 is supplied to the lossless encoding unit 16, encoded at the lossless encoding unit 16 in the later-described step S26, and added to the picture parameter set or slice header of the compressed image.

In step S24, the adaptive loop filter 111 subjects the pixel values after deblocking filter processing to adaptive filter processing, using the calculated adaptive filter coefficients. The pixel values after adaptive filter processing are output to the frame memory 22.

That is to say, the filter processing unit 133-1 performs filter processing as to pixel values after deblocking filter processing of the smooth region class, using an adaptive filter coefficient as to the smooth region class. The filter processing unit 133-2 performs filter processing as to pixel values after deblocking filter processing of the edge/texture region class, using an adaptive filter coefficient as to the edge/texture region class.

In step S25, the frame memory 22 stores the image subjected to filtering. Note that an image not subjected to filter processing by the deblocking filter 21 is also supplied from the deblocking filter 21 and adaptive loop filter 111 to the frame memory 22 for storing.

On the other hand, the transform coefficient quantized in step S18 as described above is also supplied to the lossless encoding unit 16. In step S26, the lossless encoding unit 16 encodes the quantized transform coefficient output from the quantization unit 15. Specifically, the difference image is subjected to lossless encoding such as variable length coding, arithmetic coding, or the like, and compressed.

Also, at this time, the filter coefficient input to the lossless encoding unit 16 in the above step S24, and the intra prediction mode information from the intra prediction unit 24 input to the lossless encoding unit 16 in the above step S24 or the information according to the optimal inter prediction mode from the motion prediction/compensation unit 25, and so forth are also encoded and added to the header information.

For example, the information indicating the inter prediction mode is encoded for each macroblock. The motion vector information and reference frame information are encoded for each block to be processed. The filter coefficient is encoded for each slice or picture parameter set.

In step S27, the storage buffer 17 stores the difference image as a compressed image. A compressed image stored in the storage buffer 17 is read out as appropriate, and transmitted to the decoding side via the transmission path.

In step S28, the rate control unit 27 controls a quantization operation rate of the quantization unit 15 based on a compressed image stored in the storage buffer 17 so as not to cause overflow or underflow.

[Description of Intra Prediction Processing]

Next, the intra prediction processing in step S13 in FIG. 13 will be described with reference to the flowchart in FIG. 14. Note that, with the example in FIG. 14, description will be made regarding a case of luminance signals as an example.

In step S41, the intra prediction unit 24 performs intra prediction on the intra prediction modes of 4×4 pixels, 8×8 pixels, and 16×16 pixels.

As for intra prediction modes of luminance signals, there are prediction modes of nine kinds of 4×4 pixel and 8×8 pixel block increments, and four kinds of 16×16 pixel macroblock increments, and as for intra prediction modes of color difference signals, there are prediction modes of four kinds of 8×8 pixel block increments. The intra prediction modes of color difference signals can be set independently of the intra prediction modes of luminance signals. With regard to the intra prediction modes of 4×4 pixels and 8×8 pixels of luminance signals, one intra prediction mode is defined for each block of 4×4 pixel and 8×8 pixel luminance signals. With regard to the intra prediction mode of 16×16 pixels of luminance signals, and the intra prediction modes of color difference signals, one prediction mode is defined as to one macroblock.

Specifically, the intra prediction unit 24 subjects the pixels of a block to be processed to intra prediction with reference to a decoded image read out from the frame memory 22 and supplied via the switch 23. This intra prediction processing is performed in each intra prediction mode, and accordingly, the prediction image in each intra prediction mode is generated. Note that, as for a decoded pixel to be referenced, a pixel not subjected to deblocking filtering by the deblocking filter 21 and adaptive loop filter 111 is employed.

In step S42, the intra prediction unit 24 calculates a cost function value as to each intra prediction mode of 4×4 pixels, 8×8 pixels, and 16×16 pixels. Here, as for a cost function for obtaining a cost function value, the cost function of the Expression (33) or Expression (34) is employed.

In step S43, the intra prediction unit 24 determines the corresponding optimal mode as to each intra prediction mode of 4×4 pixels, 8×8 pixels, and 16×16 pixels. That is to say, as described above, in the cases of the intra 4×4 prediction modes and intra 8×8 prediction modes, there are the nine kinds of prediction modes, and in the cases of the intra 16×16 prediction modes, there are the four kinds of prediction modes. Accordingly, the intra prediction unit 24 determines, based on the cost function values calculated in step S42, out of these, the optimal intra 4×4 prediction mode, optimal intra 8×8 prediction mode, and optimal 16×16 prediction mode.

In step S44, the intra prediction unit 24 selects, out of the optimal modes determined as to the intra prediction modes of 4×4 pixels, 8×8 pixels, and 16×16 pixels, the optimal intra prediction mode based on the cost function values calculated in step S42, i.e., selects, out of the optimal modes determined as to 4×4 pixels, 8×8 pixels, and 16×16 pixels, a mode of which the cost function value is the minimum as the optimal intra prediction mode. The intra prediction unit 24 then supplies the prediction image generated in the optimal intra prediction mode, and the cost function value thereof to the prediction image selecting unit 26.

[Description of Motion Prediction/Compensation Processing]

Next, the motion prediction/compensation processing in step S14 in FIG. 13 will be described with reference to the flowchart in FIG. 15.

In step S61, the motion prediction/compensation unit 25 determines a motion vector and a reference image as to eight kinds of inter prediction modes made up of 16×16 pixels through 4×4 pixels. That is to say, a motion vector and a reference image are each determined regarding the block to be processed of each inter prediction mode.

In step S62, the motion prediction/compensation unit 25 performs motion prediction and compensation processing on a reference image regarding eight kinds of inter prediction modes made up of 16×16 pixels through 4×4 pixels based on the motion vectors determined in step S61. According to this motion prediction and compensation processing, the prediction image in each inter prediction mode is generated.

In step S63, the motion prediction/compensation unit 25 calculates the cost function value indicated in the above Expression (33) or Expression (34) as to the eight kinds of inter prediction modes made up of 16×16 pixels through 4×4 pixels.

In step S64, the motion prediction/compensation unit 25 compares the cost function values as to the inter prediction modes calculated in step S63, and determines a prediction mode that provides the minimum value as the optimal inter prediction mode. The motion prediction/compensation unit 25 then supplies the prediction image generated in the optimal inter prediction mode and the cost function value thereof to the prediction image selecting unit 26.

[Description of Class Classification Coefficient Calculation Processing]

Figure 16:
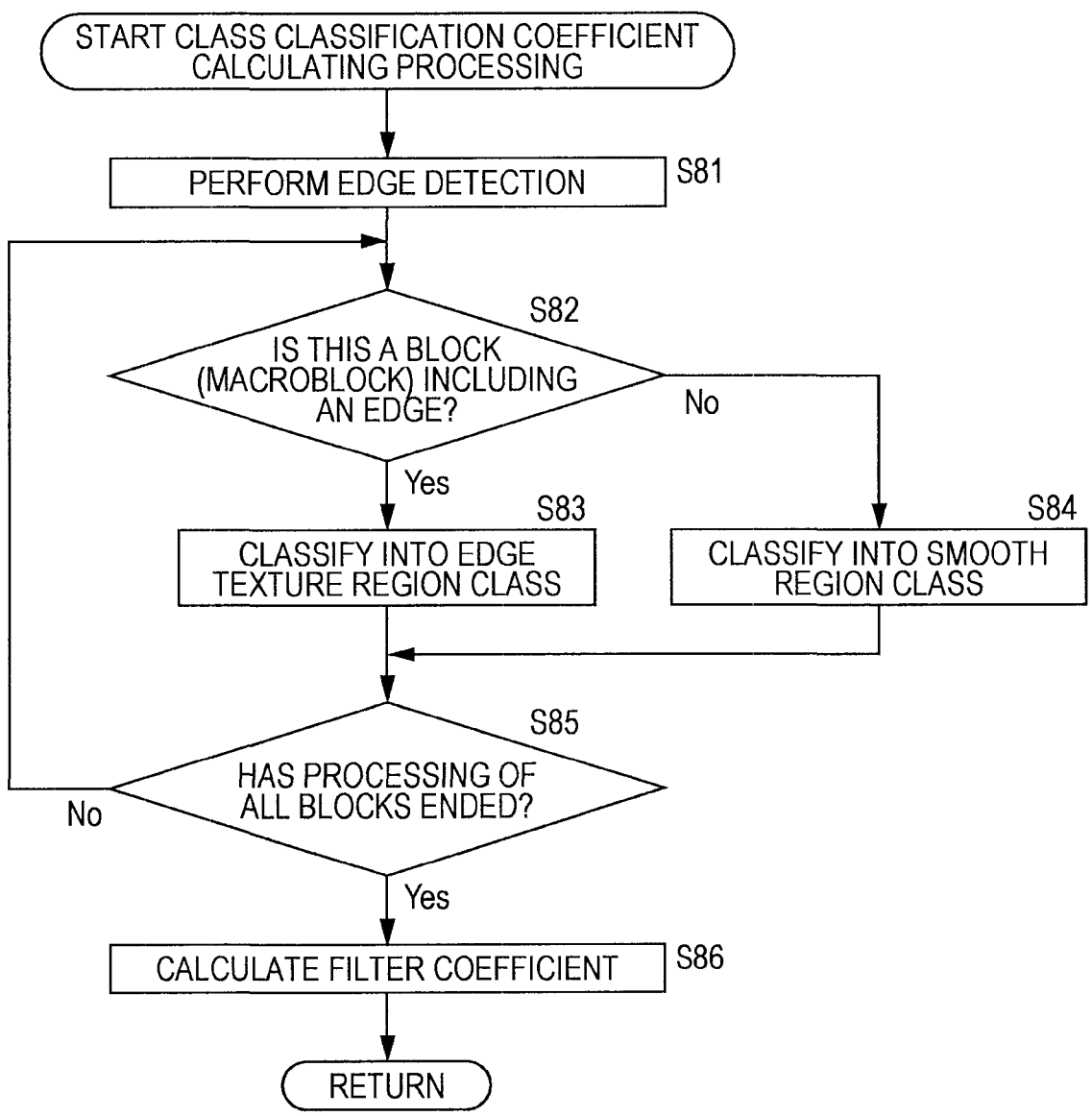
FIG. 16 is a flowchart describing an example of the class classification coefficient calculating processing in step S23 in FIG. 13.

Next, the class classification coefficient calculation processing in step S23 of FIG. 13 will be described with reference to the flowchart in FIG. 16.

The pixel values after deblocking filter processing from the deblocking filter 21 are supplied to the class classification unit 131 and the edge detecting unit 112.

In step S81 the edge detecting unit 112 performs edge detection as to the pixel values after deblocking filter processing (i.e., baseband information). Specifically, the edge detecting unit 112 calculates the edge strength at the current block or macroblock making up the decoded image, as described above with reference to Expression (36) or Expression (35), for example. The edge detecting unit 112 then supplies the calculated edge strength information to the class classification unit 131 as the results of edge detection.

In step S82, the class classification unit 131 compares the results of edge detection from the edge detecting unit 112 with the predetermined threshold value $\Theta$, thereby detecting whether one block (macroblock) is a block (macroblock) including edge/texture.

In the event that the above-described Expression (37) holds, determination is made in step S82 that this block (macroblock) is a block (macroblock) including edge/texture, and the processing advances to step S83. In step S83, the class classification unit 131 classifies that block (macroblock) into the edge/texture region class.

In the event that the above-described Expression (37) does not hold, determination is made in step S82 that this block (macroblock) is not a block (macroblock) including edge/texture, and the processing advances to step S84. In step S84, the class classification unit 131 classifies that block (macroblock) into the smooth region class.

After step S83 or S84, the processing advances to step S85. In step S85, the class classification unit 131 determines whether or not processing for all blocks (macroblocks) has ended. In the event that determination is made in step S85 that this has not ended, the flow returns to step S82, and the subsequent processing is repeated.

In the event that determination is made in step S85 that processing for all blocks (macroblocks) has ended, the class classification unit 131 supplies the pixel values of the blocks (macroblocks) to the filter coefficient calculating units 132-1 and 132-2.

That is to say, the class classification unit 131 supplies the pixel values of the blocks (macroblocks) classified into the smooth region class to the filter coefficient calculating unit 132-1. The class classification unit 131 supplies the pixel values of the blocks (macroblocks) classified into the edge/texture region class to the filter coefficient calculating unit 132-2. Subsequently, processing advances to step S86.

In step S86, the filter coefficient calculating units 132-1 and 132-2 calculate adaptive filter coefficients as to the smooth region class and edge/texture region class.

That is to say, the filter coefficient calculating unit 132-1 calculates an adaptive filter coefficient as to the smooth region class such that the residual difference between the input image pixel values from the screen rearranging buffer 12 and the pixel values after deblocking filter processing in the smooth region class is the smallest. The adaptive filter coefficient calculated for the smooth region class is supplied to the filter processing unit 133-1 along with the pixel values after deblocking filter processing in the smooth region class.

Also, the filter coefficient calculating unit 132-2 calculates an adaptive filter coefficient as to the edge/texture region class such that the residual difference between the input image pixel values from the screen rearranging buffer 12 and the pixel values after deblocking filter processing in the edge/texture region class is the smallest. The adaptive filter coefficient calculated for the edge/texture region class is supplied to the filter processing unit 133-2 along with the pixel values after deblocking filter processing in the edge/texture region class. The adaptive filter coefficients of the classes are further also supplied to the lossless encoding unit 16.

As described above, locally decoded pixels are classified into a class of macroblocks of smooth regions and a class of macroblocks of a region including edges or texture, and adaptive loop filter processing is performed on each class.

Accordingly, local distortion within the screen can be reduced. That is to say, improvement in image quality deterioration unique to each of the smooth regions and edge/texture regions can be realized.

Also, there is no need to send flag information for class classification (i.e., information for identifying which class) to the decoding side, so there is no deterioration of encoding efficiency due to the overhead of flag information.

The encoded compressed image is transmitted over a predetermined transmission path, and decoded by an image decoding device.

[Configuration Example of Image Decoding Device]

Figure 17:
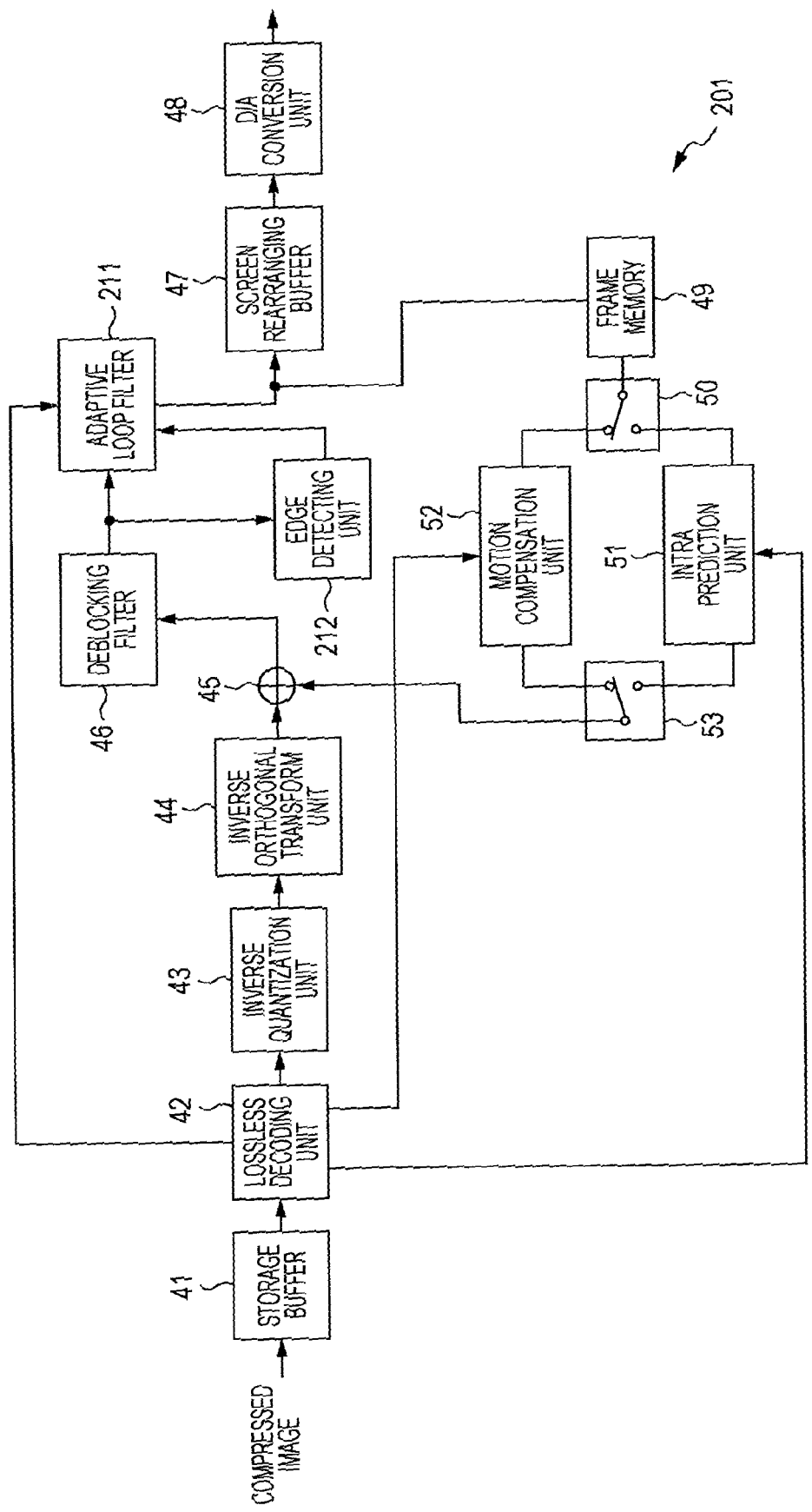
FIG. 17 is a block diagram illustrating the configuration of an embodiment of an image decoding device to which the present invention has been applied.

FIG. 17 represents the configuration of an embodiment of an image decoding device serving as an image processing device to which the present invention has been applied.

Figure 2:
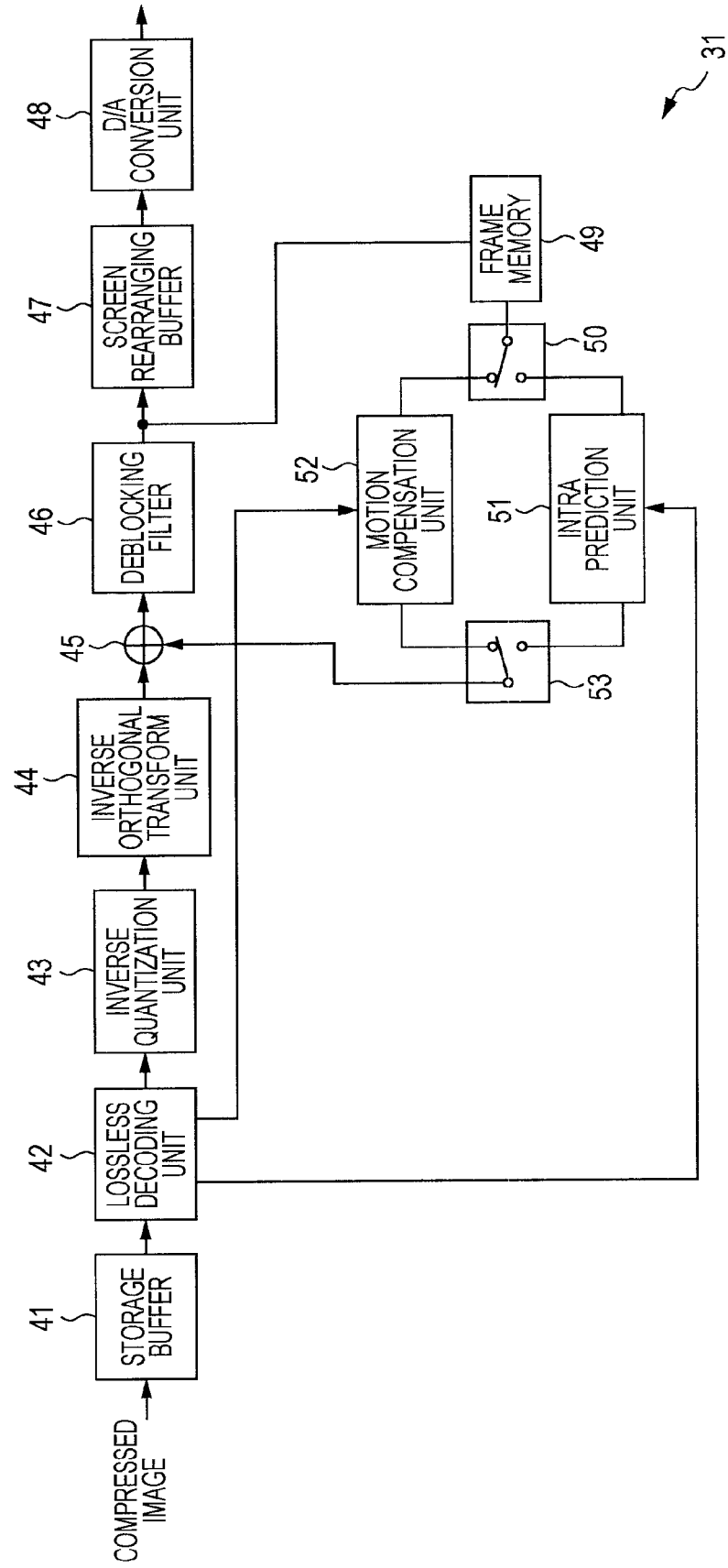
FIG. 2 is a block diagram illustrating a configuration example of an image decoding device employing the H.264/AVC format.

The image decoding device 201 in FIG. 17 has in common with the image decoding device 31 in FIG. 2 the point of having the storage buffer 41, lossless decoding unit 42, inverse quantization unit 43, inverse orthogonal transform unit 44, computing unit 45, deblocking filter 46, screen rearranging buffer 47, D/A conversion unit 48, frame memory 49, switch 50, intra prediction unit 51, motion compensation unit 52, and switch 53.

Also, the image decoding device 201 in FIG. 11 differs from the image decoding device 31 in FIG. 2 regarding the point that an adaptive loop filter 211 and an edge detecting unit 212 have been added.

That is to say, in the same way as with the lossless decoding unit 42 in FIG. 2, the lossless decoding unit 42 decodes information encoded by the lossless encoding unit 16 in FIG. 5 that has been supplied from the storage buffer 41, with a format corresponding to the encoding format of the lossless encoding unit 16. At this time, motion vector information, reference frame information, prediction mode information (information indicating intra prediction mode or inter prediction mode), smooth region class and edge/texture region class adaptive filter coefficients, and so forth, are also decoded.

The motion vector information and reference frame information are supplied to the motion compensation unit 52 every block. The prediction mode information is supplied to the corresponding unit of the intra prediction unit 51 and motion compensation unit 52, for every block. The adaptive filter coefficients of the classes are supplied to the adaptive loop filter 211 every slice or every picture parameter set.

The adaptive loop filter 211 and edge detecting unit 212 are provided after the deblocking filter 46 and before the frame memory 49. That is to say, the adaptive loop filter 211 and edge detecting unit 212 are provided within a motion compensation loop made up of the computing unit 45, deblocking filter 46, frame memory 49, switch 50, motion compensation unit 52, and switch 53. That is to say, an image is used being looped within the motion compensation loop.

The adaptive loop filter 211 uses calculated filter coefficients supplied from the lossless decoding unit 42 to perform filter processing on the decoded image from the deblocking filter 46. As for this filter, a Wiener filter (Wiener Filter) is employed, for example.

Note however, that the adaptive loop filter 211 classifies the decoded image from the deblocking filter 46 (baseband information after local decoding) into classes according to the baseband information thereof, in the same way as with the adaptive loop filter 111 in FIG. 5. Specifically, the decoded image from the deblocking filter 46 is classified into classes according to the information obtained from the baseband information, i.e. edge information detected by the edge detecting unit 212, as the baseband information thereof.

The adaptive loop filter 211 performs frame processing for each of the classified classes, using the adaptive filter coefficients supplied from the lossless decoding unit 42, and outputs the image following filter processing to the screen rearranging buffer 47 and frame memory 49.

The edge detecting unit 212 detects edges in the decoded image from the deblocking filter 46 (baseband information after local decoding) in the same way as with the edge detecting unit 112 in FIG. 5, and supplies the edge information which is the results of having detected edges to the adaptive loop filter 211.

Note that with the example in FIG. 17 as well, an example is illustrated where the decoded image from the deblocking filter 46 is directly input to the edge detecting unit 212, but a configuration may be made where the decoded image from the deblocking filter 46 is temporarily stored in the frame memory 49 and this is input to the edge detecting unit 212.

Note that with the adaptive loop filter 111 in FIG. 5, adaptive filter coefficients are calculated with pixel values of the classes being used, and filter processing is performed on the pixel values of each class. As opposed to this, with the adaptive loop filter 211 in FIG. 17, filter processing is performed on the pixel values of each class using filter coefficients obtained every slice or every picture parameter set from the header of the compressed image.

[Configuration Example of Adaptive Loop Filter]

Figure 18:
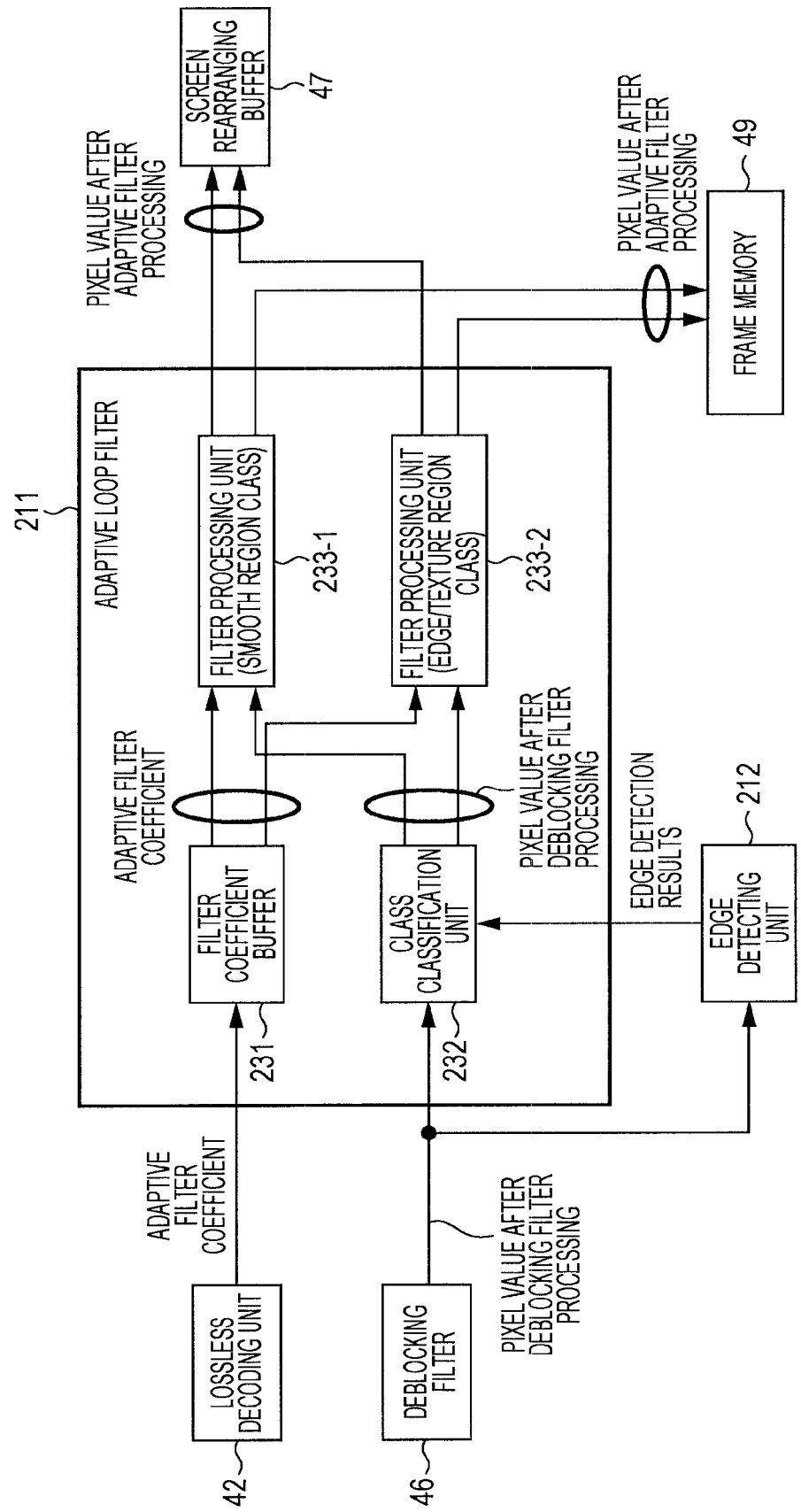
FIG. 18 is a block diagram illustrating a configuration example of the adaptive loop filter in FIG. 17.

FIG. 18 is a block diagram illustrating a configuration example of the adaptive loop filter 211.

In the example in FIG. 18, the adaptive loop filter 211 is configured of a filter coefficient buffer 231, a class classification unit 232, and filter processing units 233-1 and 233-2.

The lossless decoding unit 42 supplies to the filter coefficient buffer 231 adaptive filter coefficients as to the smooth region class and edge/texture region class, obtained from the picture parameter set or slice header.

The filter coefficient buffer 231 stores an adaptive filter coefficient corresponding to the smooth region class and an adaptive filter coefficient corresponding to the edge/texture region class. The filter coefficient buffer 231 then supplies the adaptive filter coefficient corresponding to the smooth region class to the filter processing unit 233-1, and supplies the adaptive filter coefficient corresponding to the edge/texture region class to the filter processing unit 233-2.

The pixel values after deblocking filter processing from the deblocking filter 46 are supplied to the class classification unit 232 and the edge detecting unit 112. Also, edge information, which is the results of edge detection detecting using the pixel values after deblocking filter processing, is supplied from the edge detecting unit 212 to the class classification unit 232.

The class classification unit 232 classifies the pixel values of each macroblock (or block) after deblocking filter processing into those belonging to the smooth region class and those belonging to the edge/texture region class, in accordance with the edge information from the edge detecting unit 212. The class classification unit 232 then supplies the pixel values of the classified classes to the filter processing units 233-1 and 233-2, respectively.

The filter processing unit 233-1 performs filter processing on the pixel values classified into the smooth region class, using the adaptive filter coefficient corresponding to the smooth region class from the filter coefficient buffer 231. The filter processing unit 233-2 performs filter processing on the pixel values classified into the edge/texture region class, using the adaptive filter coefficient corresponding to the edge/texture region class from the filter coefficient buffer 231.

The pixel values after the adaptive filter processing are output to the screen rearranging buffer 47 and frame memory 49.

[Description of Decoding Processing of Image Decoding Device]

Figure 19:
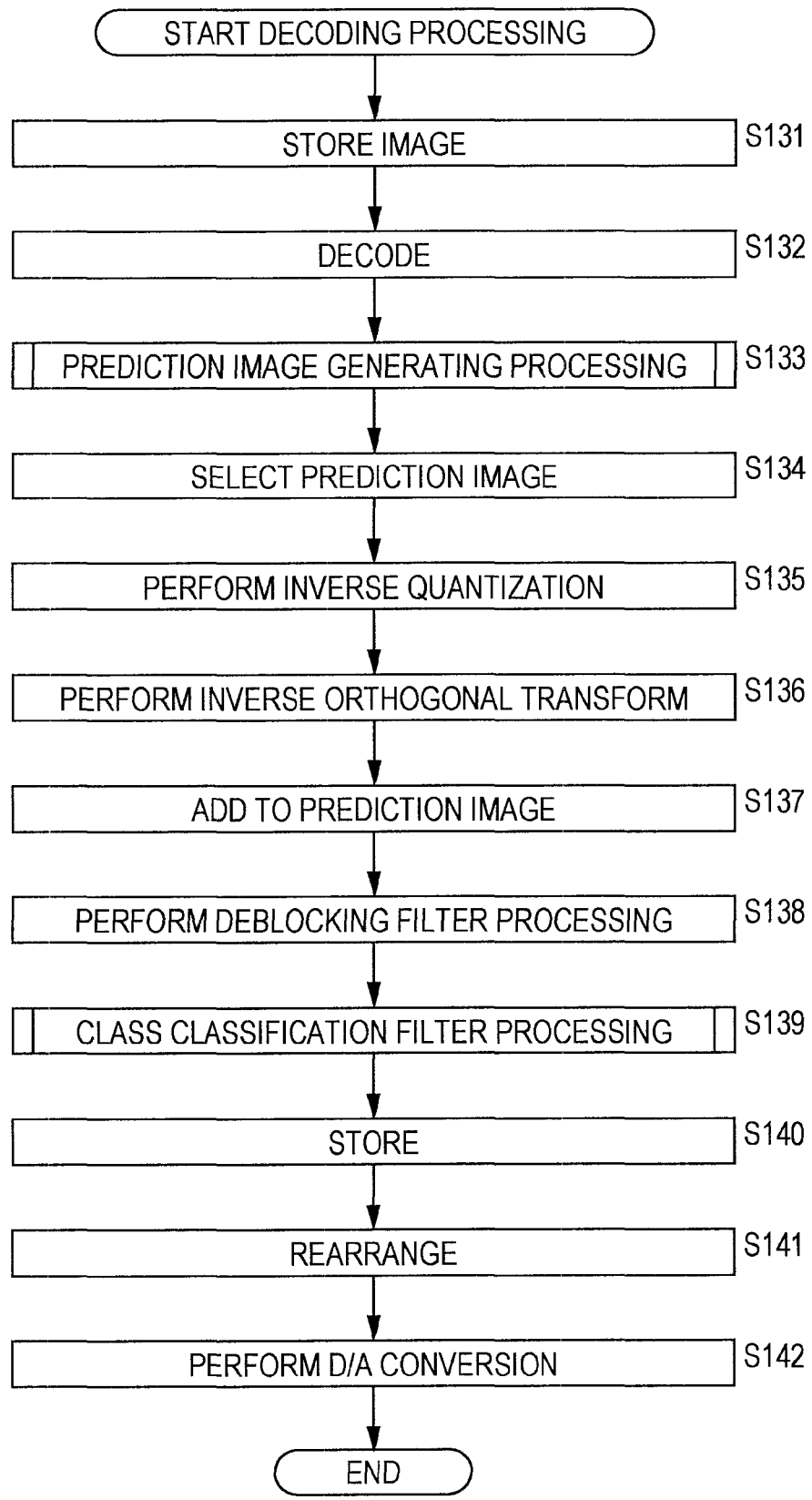
FIG. 19 is a flowchart describing decoding processing of the image decoding device in FIG. 17.

Next, decoding processing that the image decoding device 201 executes will be described with reference to the flowchart in FIG. 19.

In step S131, the storage buffer 41 stores an image transmitted thereto. In step S132, the lossless decoding unit 42 decodes the compressed image supplied from the storage buffer 41. That is to say, the I picture, P picture, and B picture encoded by the lossless encoding unit 16 in FIG. 5 are decoded.

At this time, the motion vector information, reference frame information, prediction mode information (information indicating intra prediction mode or inter prediction mode), adaptive filter coefficients for each class, and so forth are also decoded.

Specifically, in the event that the prediction mode information is the intra prediction mode information, the prediction mode information is supplied to the intra prediction unit 51. In the event that the prediction mode information is the inter prediction mode information, the motion vector information and reference frame information corresponding to the prediction mode information are supplied to the motion compensation unit 52. The adaptive filter coefficients for each class are decoded every slice, or picture parameter set, and supplied to the adaptive loop filter 211.

In step S133, the intra prediction unit 51 or motion compensation unit 52 performs prediction image generating processing in response to the prediction mode information supplied from the lossless decoding unit 42.

Specifically, in the event that the intra prediction mode information has been supplied from the lossless decoding unit 42, the intra prediction unit 51 performs intra prediction processing of an intra prediction mode to generate an intra prediction image. In the event that the inter prediction mode information has been supplied from the lossless decoding unit 42, the motion compensation unit 52 performs motion prediction/compensation processing of an inter prediction mode to generate an inter prediction image.

Figure 20:
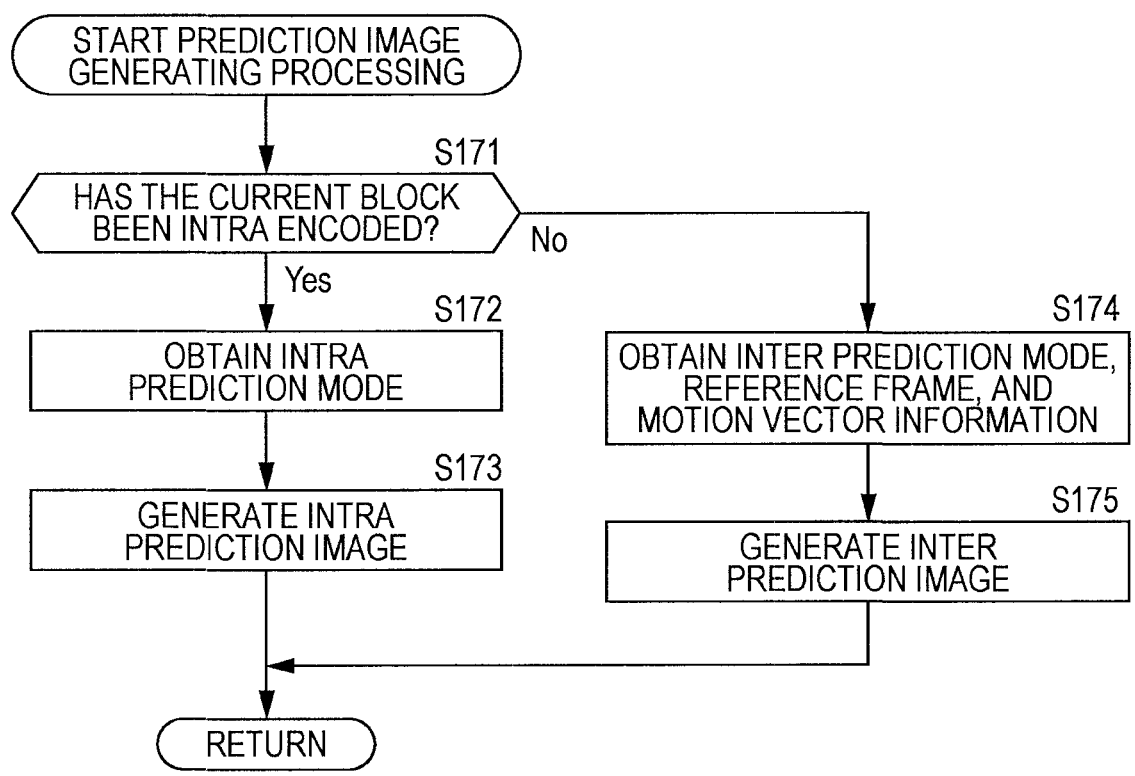
FIG. 20 is a flowchart describing the prediction image generating processing in step S133 in FIG. 19.

While the details of the prediction processing in step S133 will be described later with reference to FIG. 20, according to this processing, the prediction image generated by the intra prediction unit 51 (intra prediction image) or the prediction image generated by the motion compensation unit 52 (inter prediction image) is supplied to the switch 53.

In step S134, the switch 53 selects a prediction image. That is to say, the prediction image generated by the intra prediction unit 51, or the prediction image generated by the motion compensation unit 52 is supplied. Accordingly, the supplied prediction image is selected and supplied to the computing unit 45, and in later-described step S137 added to the output of the inverse orthogonal transform unit 44.

In step S132 described above, the transform coefficients decoded by the lossless decoding unit 42 are also supplied to the inverse quantization unit 43. In step S135, the inverse quantization unit 43 subjects the transform coefficient decoded by the lossless decoding unit 42 to inverse quantization with a property corresponding to the property of the quantization unit 15 in FIG. 5.

In step S136, the inverse orthogonal transform unit 44 subjects the transform coefficient subjected to inverse quantization by the inverse quantization unit 43 to inverse orthogonal transform with a property corresponding to the property of the orthogonal transform unit 14 in FIG. 5. Thus, difference information corresponding to the input of the orthogonal transform unit 14 in FIG. 5 (output of the computing unit 13) is decoded.

In step S137, the computing unit 45 adds a prediction image to be selected at processing in the above-described step S134, and input via the switch 53, to the difference information. Thus, the original image is decoded. In step S138, the deblocking filter 46 subjects the image output from the computing unit 45 to deblocking filter processing. Thus, block noise of the overall screen is removed.

In step S139, the adaptive loop filter 111 performs class classification filter processing. Details of this class classification filter processing will be described later with reference to FIG. 21. Note that the adaptive loop filter 211 in this case is configured as illustrated in FIG. 18.

Due to the processing in step S139, class classification is performed according to the baseband information of the decoded image, i.e., edge information obtained from the baseband information, and adaptive filter processing is performed as to each class. The pixel values after adaptive filter processing are output to the screen rearranging buffer 47 and frame memory 49.

In step S140, the frame memory 49 stores the image subjected to filtering.

In step S141, the screen rearranging buffer 47 performs rearranging of images after the adaptive loop filter 211. That is to say, the order of frames rearranged for encoding by the screen rearranging buffer 12 of the image encoding device 101 is rearranged in the original display order.

In step S142, the D/A conversion unit 48 performs D/A conversion of the image from the screen rearranging buffer 47. This image is output to an unshown display, and the image is displayed thereon.

[Description of Prediction Image Generating Processing of Image Decoding Device]

Next, the prediction image generating processing of step S133 in FIG. 19 will be described with reference to the flowchart in FIG. 20.

In step S171, the intra prediction unit 51 determines whether or not the current block is intra encoded or not. Upon intra prediction mode information begin supplied from the lossless decoding unit 42 to the intra prediction unit 51, in step S171 the intra prediction unit 51 determines that the current block is intra encoded, and the processing advances to step S172. At this time, the intra prediction unit 51 supplies this intra prediction mode information to the edge detecting unit 212.

In step S172, the intra prediction unit 51 obtains the intra prediction mode information, and in step S173 performs intra prediction and generates an intra prediction image.

That is to say, in the event that the image to be processed is an image which is to be intra processed, the necessary image is read out from the frame memory 49 and supplied to the intra prediction unit 51 via the switch 50. In step S173, the intra prediction unit 51 performs intra prediction following the intra prediction mode information obtained in step S172 and generates a prediction image. The generated prediction image is output to the switch 53.

On the other hand, in the event that determination is made in step S171 that this is not intra encoded, the processing advances to step S174.

In the event that the image to be processed is an image to be inter processed, inter prediction mode information, reference frame information, and motion vector information are supplied to the motion compensation unit 52 from the lossless decoding unit 42.

In step S174, the motion compensation unit 52 obtains prediction mode information and the like from the lossless decoding unit 42. That is to say, motion (inter) prediction mode information, reference frame information, and motion vector information, are obtained.

In step S175, the motion compensation unit 52 performs compensation on the reference image from the frame memory 49 using the motion vector information, and generates an inter prediction image. The generated prediction image is supplied to the computing unit 45 via the switch 53, and added to the output of the inverse orthogonal transform unit 44 in step S137 in FIG. 19.

[Description of Class Classification Filter Processing of Image Decoding Device]

Figure 21:
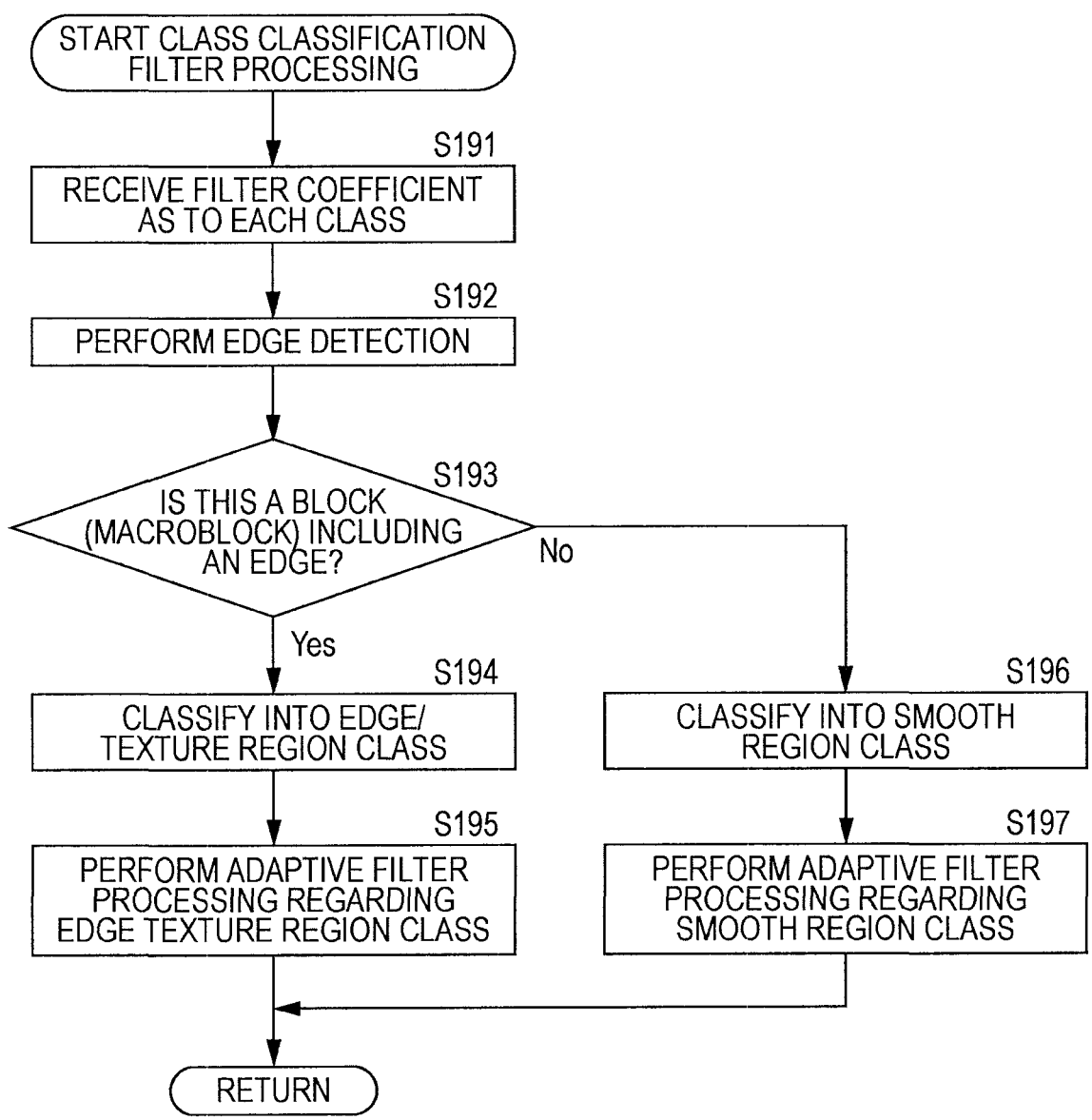
FIG. 21 is a flowchart describing an example of the class classification filter processing in step S139 in FIG. 19.

Next, the class classification filter processing in step S139 of FIG. 19 will be described with reference to the flowchart in FIG. 21.

The lossless decoding unit 42 supplies each of the adaptive filter coefficients corresponding to the smooth region class and edge/texture region class, obtained from the picture parameter set or slice header, to the filter coefficient buffer 231.

The filter coefficient buffer 231 stores the adaptive filter coefficients corresponding to the smooth region class and edge/texture region class, and supplies the adaptive filter coefficient corresponding to the smooth region class to the filter processing unit 233-1. Also, the filter coefficient buffer 231 supplies the adaptive filter coefficient corresponding to the edge/texture region class to the filter processing unit 233-2.

In step S191, the filter processing units 233-1 and 233-2 each receive the adaptive filter coefficients corresponding to the respective classes, from the filter coefficient buffer 231.

The pixel values after deblocking filter processing are supplied from the deblocking filter 46 to the class classification unit 232 and edge detecting unit 212.

In step S192, the edge detecting unit 212 performs edge detection as to the pixel values after deblocking filter processing (i.e., baseband information). Specifically, the edge detecting unit 212 calculates the edge strength in the current block or macroblock making up the decoded image, as described above with reference to Expression (36) and Expression (35), for example. The edge detecting unit 212 then supplies the calculated edge strength to the class classification unit 232 as edge detection results.

In step S193, the class classification unit 232 compares the results of edge detection from the edge detecting unit 212 with the predetermined threshold value $\Theta$, thereby determining whether or not the block (macroblock) to be processed is a block (macroblock) including edge/texture.

In the event that the above-described Expression (37) holds, determination is made in step S193 that the block (macroblock) is a block (macroblock) including edge/texture, and the processing advances to step S194. In step S194 the class classification unit 231 classifies this block (macroblock) into the edge/texture region class.

The class classification unit 232 supplies the pixel values of the macro block classified into the edge/texture region class to the filter processing unit 233-2.

In step S195, the filter processing unit 233-2 performs adaptive filter processing regarding the edge/texture region class. That is to say, the filter processing unit 233-2 performs filter processing on the pixel values of the macroblock classified by the class classification unit 232 into the edge/texture region class, using the adaptive filter coefficient corresponding to the edge/texture region class from the filter coefficient buffer 231. These pixel values after adaptive filter processing are supplied to the screen rearranging buffer 47 and frame buffer 49.

On the other hand, in the event that the above-described Expression (37) does not hold, determination is made in step S193 that the block (macroblock) is not a block (macroblock) including edge/texture, and the processing advances to step S196. In step S196 the class classification unit 232 classifies this block (macroblock) into the smooth region class.

The class classification unit 232 supplies the pixel values of the macro block classified into the smooth region class to the filter processing unit 233-1.

In step S197, the filter processing unit 233-1 performs adaptive filter processing regarding the smooth region class. That is to say, the filter processing unit 233-1 performs filter processing on the pixel values of the macroblock classified by the class classification unit 232 into the smooth region class, using the adaptive filter coefficient corresponding to the smooth region class from the filter coefficient buffer 231. These pixel values after adaptive filter processing are supplied to the screen rearranging buffer 47 and frame buffer 49.

Thus, with the image encoding device 101 and image decoding device 201, decoded images are classified into classes according to edge information obtained form the baseband information thereof, and adaptive fill filter processing is performed for each class.

Accordingly, image quality deterioration in the overall screen is minimized, and local image quality deterioration which occurs in each of regions including smooth portions and texture and the like of the screen can also be improved. That is to say, improvement in image quality deterioration unique to each of the smooth regions and edge/texture regions can be realized, and as a result, encoding efficiency can be improved and subjective image quality in decoded images can be improved.

Note that in the above description, at the image decoding device 201, pixel values after adaptive filter processing using the filter coefficients calculated by the image encoding device 101 are supplied not only to the frame memory 49 but also the screen rearranging buffer 47. An arrangement may also be made wherein, unrestricted to this, regarding adaptive filters output to the screen rearranging buffer 47, filter coefficients are calculated for each class classified in accordance with the edge information obtained form the baseband information of the decoded image, and the calculated filter coefficients are used.

Accordingly, subjective image quality in decoded images can be further improved.

With the above description, though the H.264/AVC format is used as a base as an encoding format, the present invention is not restricted to this, and other encoding formats/decoding formats including adaptive filtering within the motion prediction/compensation loop may be applied.

Note that the present invention may be applied to an image encoding device and an image decoding device used at the time of receiving image information (bit streams) compressed by orthogonal transform such as discrete cosine transform or the like and motion compensation via a network medium such as satellite broadcasting, a cable television, the Internet, a cellular phone, or the like, for example, as with MPEG, H.26x, or the like. Also, the present invention may be applied to an image encoding device and an image decoding device used at the time of processing image information on storage media such as an optical disc, a magnetic disk, and flash memory. Further, the present invention may be applied to a motion prediction compensation device included in such an image encoding device and an image decoding device and so forth.

The above-mentioned series of processing may be executed by hardware, or may be executed by software. In the event of executing the series of processing by software, a program making up the software thereof is installed in a computer. Here, examples of the computer include a computer built into dedicated hardware, and a general-purpose personal computer whereby various functions can be executed by various types of programs being installed thereto.

[Configuration Example of Personal Computer]

Figure 22:
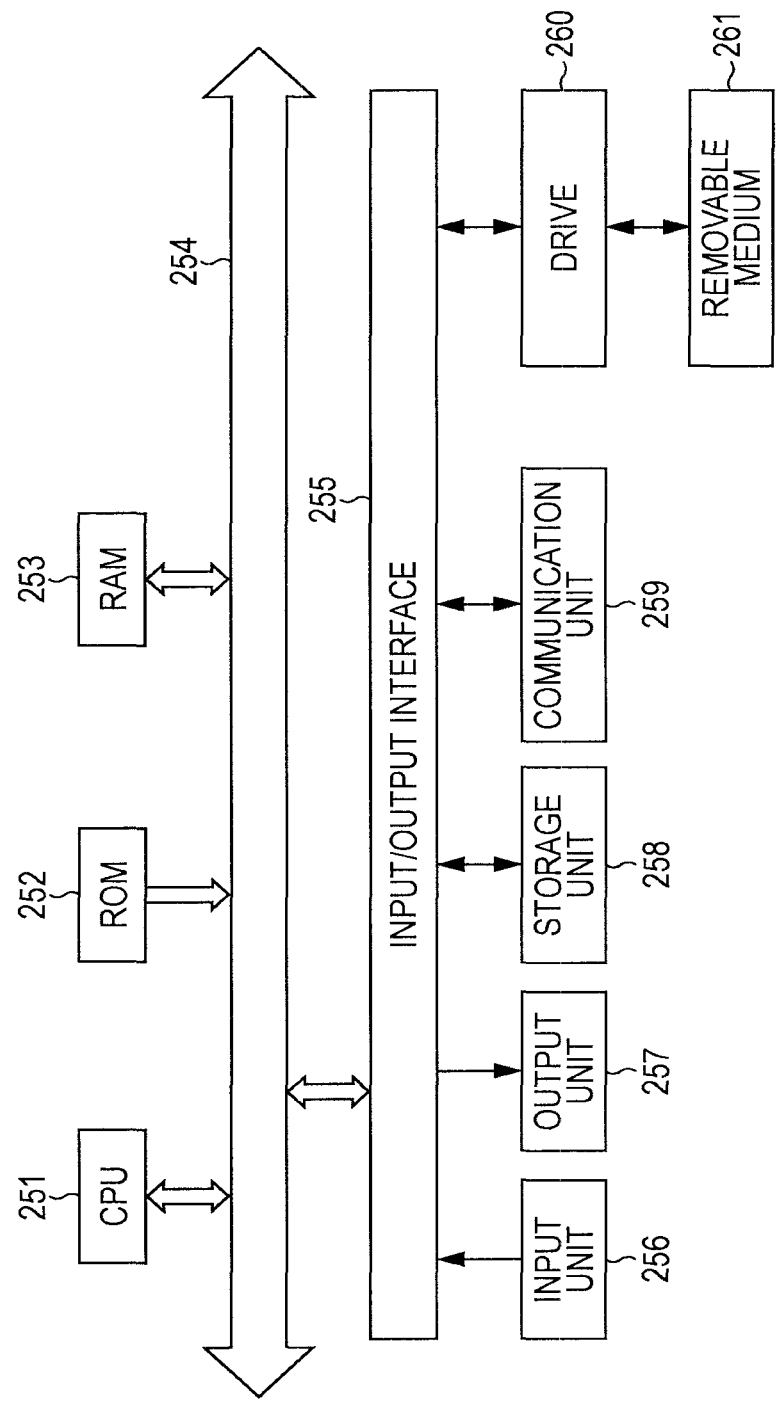
FIG. 22 is a block diagram illustrating a configuration example of the hardware of a computer.

FIG. 22 is a block diagram illustrating a configuration example of the hardware of a computer which executes the above-mentioned series of processing using a program.

With the computer, a CPU (Central Processing Unit) 251, ROM (Read Only Memory) 252, and RAM (Random Access Memory) 253 are mutually connected by a bus 254.

Further, an input/output interface 255 is connected to the bus 254. An input unit 256, an output unit 257, a storage unit 258, a communication unit 259, and a drive 260 are connected to the input/output interface 255.

The input unit 256 is made up of a keyboard, a mouse, a microphone, and so forth. The output unit 257 is made up of a display, a speaker, and so forth. The storage unit 258 is made up of a hard disk, nonvolatile memory, and so forth. The communication unit 259 is made up of a network interface and so forth. The drive 260 drives a removable medium 261 such as a magnetic disk, an optical disc, a magneto-optical disk, semiconductor memory, or the like.

With the computer thus configured, for example, the CPU 251 loads a program stored in the storage unit 258 to the RAM 253 via the input/output interface 255 and bus 254, and executes the program, and accordingly, the above-mentioned series of processing is performed.

The program that the computer (CPU 251) executes may be provided by being recorded in the removable medium 261 serving as a package medium or the like, for example. Also, the program may be provided via a cable or wireless transmission medium such as a local area network, the Internet, or digital broadcasting.

With the computer, the program may be installed in the storage unit 258 via the input/output interface 255 by mounting the removable medium 261 on the drive 260. Also, the program may be received by the communication unit 259 via a cable or wireless transmission medium, and installed in the storage unit 258. Additionally, the program may be installed in the ROM 252 or storage unit 258 beforehand.

Note that the program that the computer executes may be a program wherein the processing is performed in the time sequence along the sequence described in the present Specification, or may be a program wherein the processing is performed in parallel or at necessary timing such as when call-up is performed.

The embodiments of the present invention are not restricted to the above-mentioned embodiment, and various modifications may be made without departing from the essence of the present invention.

For example, the above image encoding device 101 and image decoding device 201 may be applied to an optional electric device. Hereafter, examples thereof will be described.

[Configuration Example of Television Receiver]

Figure 23:
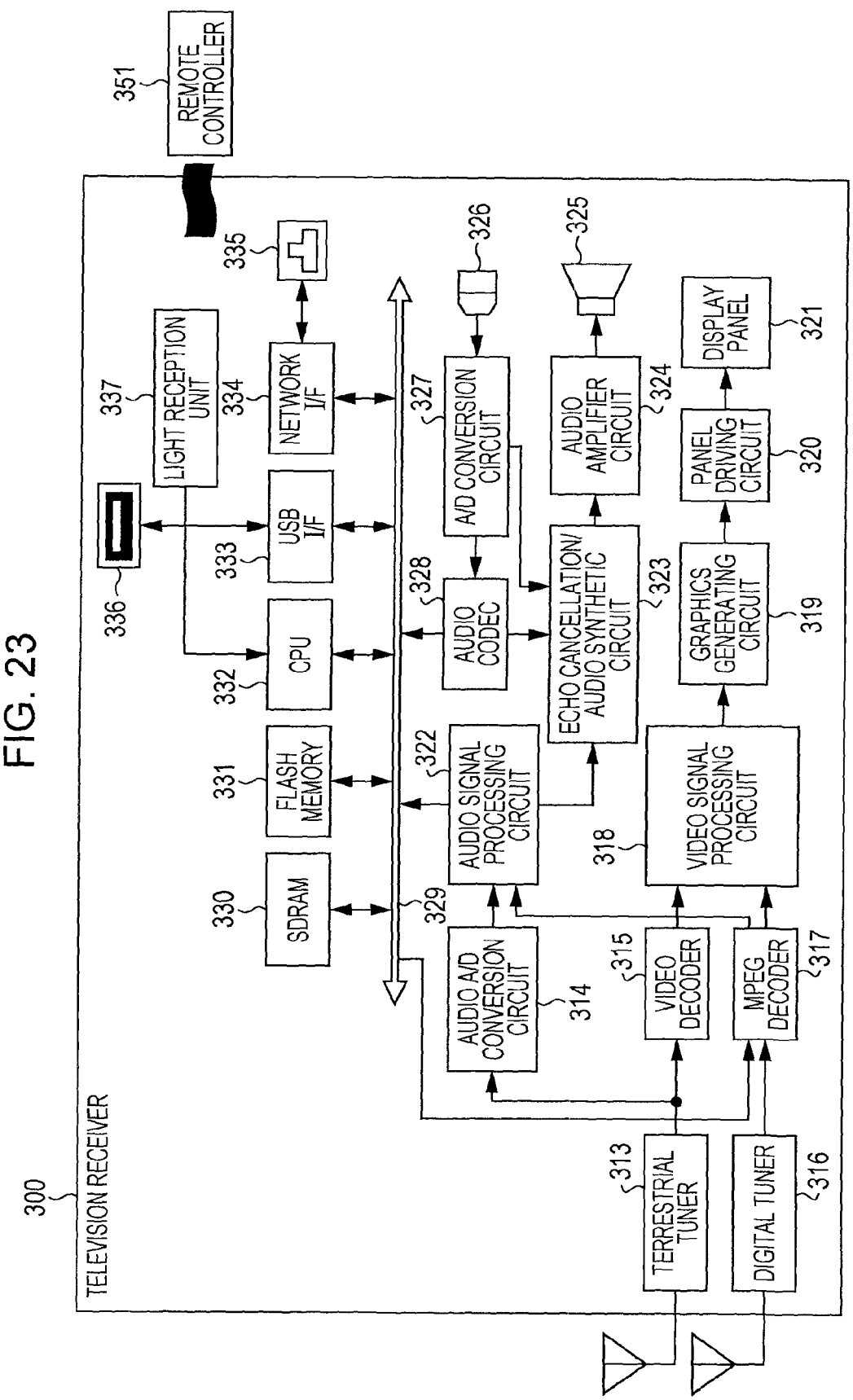
FIG. 23 is a block diagram illustrating a principal configuration example of a television receiver to which the present invention has been applied.

FIG. 23 is a block diagram illustrating a principal configuration example of a television receiver using an image decoding device to which the present invention has been applied.

A television receiver 300 shown in FIG. 23 includes a terrestrial tuner 313, a video decoder 315, a video signal processing circuit 318, a graphics generating circuit 319, a panel driving circuit 320, and a display panel 321.

The terrestrial tuner 313 receives the broadcast wave signals of a terrestrial analog broadcast via an antenna, demodulates, obtains video signals, and supplies these to the video decoder 315. The video decoder 315 subjects the video signals supplied from the terrestrial tuner 313 to decoding processing, and supplies the obtained digital component signals to the video signal processing circuit 318.

The video signal processing circuit 318 subjects the video data supplied from the video decoder 315 to predetermined processing such as noise removal or the like, and supplies the obtained video data to the graphics generating circuit 319.

The graphics generating circuit 319 generates the video data of a program to be displayed on a display panel 321, or image data due to processing based on an application to be supplied via a network, or the like, and supplies the generated video data or image data to the panel driving circuit 320. Also, the graphics generating circuit 319 also performs processing such as supplying video data obtained by generating video data (graphics) for the user displaying a screen used for selection of an item or the like, and superimposing this on the video data of a program, to the panel driving circuit 320 as appropriate.

The panel driving circuit 320 drives the display panel 321 based on the data supplied from the graphics generating circuit 319 to display the video of a program, or the above-mentioned various screens on the display panel 321.

The display panel 321 is made up of an LCD (Liquid Crystal Display) and so forth, and displays the video of a program or the like in accordance with the control by the panel driving circuit 320.

Also, the television receiver 300 also includes an audio A/D (Analog/Digital) conversion circuit 314, an audio signal processing circuit 322, an echo cancellation/audio synthesizing circuit 323, an audio amplifier circuit 324, and a speaker 325.

The terrestrial tuner 313 demodulates the received broadcast wave signal, thereby obtaining not only a video signal but also an audio signal. The terrestrial tuner 313 supplies the obtained audio signal to the audio A/D conversion circuit 314.

The audio A/D conversion circuit 314 subjects the audio signal supplied from the terrestrial tuner 313 to A/D conversion processing, and supplies the obtained digital audio signal to the audio signal processing circuit 322.

The audio signal processing circuit 322 subjects the audio data supplied from the audio A/D conversion circuit 314 to predetermined processing such as noise removal or the like, and supplies the obtained audio data to the echo cancellation/audio synthesizing circuit 323.

The echo cancellation/audio synthesizing circuit 323 supplies the audio data supplied from the audio signal processing circuit 322 to the audio amplifier circuit 324.

The audio amplifier circuit 324 subjects the audio data supplied from the echo cancellation/audio synthesizing circuit 323 to D/A conversion processing, subjects to amplifier processing to adjust to predetermined volume, and then outputs the audio from the speaker 325.

Further, the television receiver 300 also includes a digital tuner 316, and an MPEG decoder 317.

The digital tuner 316 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 317.

The MPEG decoder 317 descrambles the scrambling given to the MPEG-TS supplied from the digital tuner 316, and extracts a stream including the data of a program serving as a playing object (viewing object). The MPEG decoder 317 decodes an audio packet making up the extracted stream, supplies the obtained audio data to the audio signal processing circuit 322, and also decodes a video packet making up the stream, and supplies the obtained video data to the video signal processing circuit 318. Also, the MPEG decoder 317 supplies EPG (Electronic Program Guide) data extracted from the MPEG-TS to a CPU 332 via an unshown path.

The television receiver 300 uses the above-mentioned image decoding device 201 as the MPEG decoder 317 for decoding video packets in this way. Accordingly, in the same way as with the case of the image decoding device 201, the MPEG decoder 317 can improve encoding efficiency, and can improve subjective image quality in decoded images.

The video data supplied from the MPEG decoder 317 is, in the same way as with the case of the video data supplied from the video decoder 315, subjected to predetermined processing at the video signal processing circuit 318. The video data subjected to predetermined processing is then superimposed on the generated video data and so forth at the graphics generating circuit 319 as appropriate, supplied to the display panel 321 via the panel driving circuit 320, and the image thereof is displayed thereon.

The audio data supplied from the MPEG decoder 317 is, in the same way as with the case of the audio data supplied from the audio A/D conversion circuit 314, subjected to predetermined processing at the audio signal processing circuit 322, supplied to the audio amplifier circuit 324 via the echo cancellation/audio synthesizing circuit 323, and subjected to D/A conversion processing and amplifier processing. As a result thereof, the audio adjusted in predetermined volume is output from the speaker 325.

Also, the television receiver 300 also includes a microphone 326, and an A/D conversion circuit 327.

The A/D conversion circuit 327 receives the user's audio signals collected by the microphone 326 provided to the television receiver 300 serving as for audio conversation, subjects the received audio signal to A/D conversion processing, and supplies the obtained digital audio data to the echo cancellation/audio synthesizing circuit 323.

In the event that the user (user A)'s audio data of the television receiver 300 has been supplied from the A/D conversion circuit 327, the echo cancellation/audio synthesizing circuit 323 performs echo cancellation with the user (user A)'s audio data taken as a object, and outputs audio data obtained by synthesizing with other audio data, or the like from the speaker 325 via the audio amplifier circuit 324.

Further, the television receiver 300 also includes an audio codec 328, an internal bus 329, SDRAM (Synchronous Dynamic Random Access Memory) 330, flash memory 331, a CPU 332, a USB (Universal Serial Bus) I/F 333, and a network I/F 334.

The A/D conversion circuit 327 receives the user's audio signal collected by the microphone 326 provided to the television receiver 300 serving as for audio conversation, subjects the received audio signal to A/D conversion processing, and supplies the obtained digital audio data to the audio codec 328.

The audio codec 328 converts the audio data supplied from the A/D conversion circuit 327 into the data of a predetermined format for transmission via a network, and supplies to the network I/F 334 via the internal bus 329.

The network I/F 334 is connected to the network via a cable mounted on a network terminal 335. The network I/F 334 transmits the audio data supplied from the audio codec 328 to another device connected to the network thereof, for example. Also, the network I/F 334 receives, via the network terminal 335, the audio data transmitted from another device connected thereto via the network, and supplies this to the audio codec 328 via the internal bus 329, for example.

The audio codec 328 converts the audio data supplied from the network I/F 334 into the data of a predetermined format, and supplies this to the echo cancellation/audio synthesizing circuit 323.

The echo cancellation/audio synthesizing circuit 323 performs echo cancellation with the audio data supplied from the audio codec 328 taken as a object, and outputs the data of audio obtained by synthesizing the audio data and other audio data, or the like, from the speaker 325 via the audio amplifier circuit 324.

The SDRAM 330 stores various types of data necessary for the CPU 332 performing processing.

The flash memory 331 stores a program to be executed by the CPU 332. The program stored in the flash memory 331 is read out by the CPU 332 at predetermined timing such as when activating the television receiver 300, or the like. EPG data obtained via a digital broadcast, data obtained from a predetermined server via the network, and so forth are also stored in the flash memory 331.

For example, MPEG-TS including the content data obtained from a predetermined server via the network by the control of the CPU 332 is stored in the flash memory 331. The flash memory 331 supplies the MPEG-TS thereof to the MPEG decoder 317 via the internal bus 329 by the control of the CPU 332, for example.

The MPEG decoder 317 processes the MPEG-TS thereof in the same way as with the case of the MPEG-TS supplied from the digital tuner 316. In this way, the television receiver 300 receives the content data made up of video, audio, and so forth via the network, decodes using the MPEG decoder 317, whereby video thereof can be displayed, and audio thereof can be output.

Also, the television receiver 300 also includes a light reception unit 337 for receiving the infrared signal transmitted from a remote controller 351.

The light reception unit 337 receives infrared rays from the remote controller 351, and outputs a control code representing the content of the user's operation obtained by demodulation, to the CPU 332.

The CPU 332 executes the program stored in the flash memory 331 to control the entire operation of the television receiver 300 according to the control code supplied from the light reception unit 337, and so forth. The CPU 332, and the units of the television receiver 300 are connected via an unshown path.

The USB I/F 333 performs transmission/reception of data as to an external device of the television receiver 300 which is connected via a USB cable mounted on a USB terminal 336. The network I/F 334 connects to the network via a cable mounted on the network terminal 335, also performs transmission/reception of data other than audio data as to various devices connected to the network.

The television receiver 300 can improve encoding efficiency by using the image decoding device 201 as the MPEG decoder 317. As a result thereof, the television receiver 300 can obtain and display higher image quality decoded images from broadcast signals received via an antenna or content data obtained via a network.

[Configuration Example of Cellular Telephone]

Figure 24:
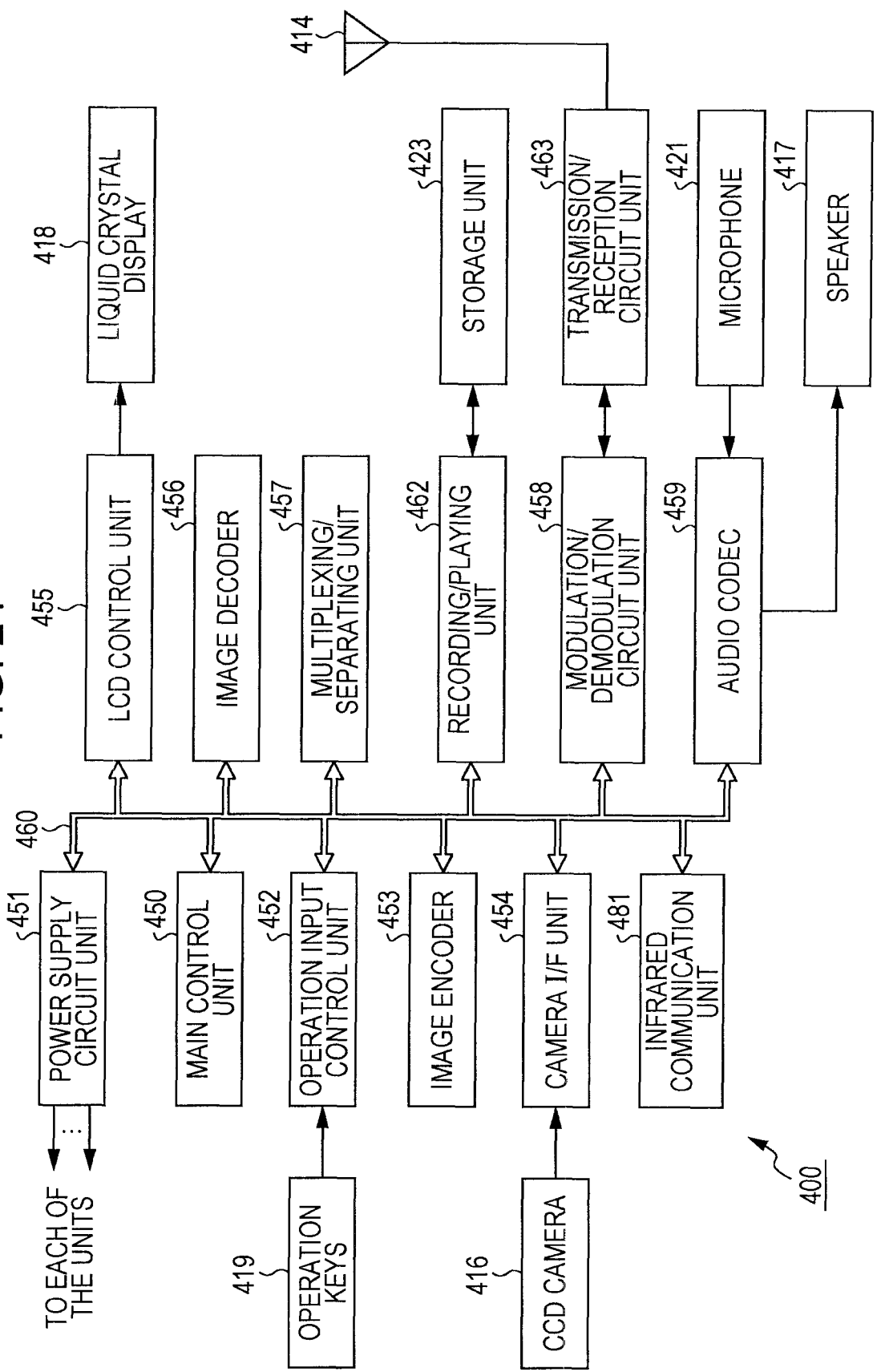
FIG. 24 is a block diagram illustrating a principal configuration example of a cellular telephone to which the present invention has been applied.

FIG. 24 is a block diagram illustrating a principal configuration example of a cellular telephone using the image encoding device and image decoding device to which the present invention has been applied.

A cellular telephone 400 shown in FIG. 24 includes a main control unit 450 configured so as to integrally control the units, a power supply circuit unit 451, an operation input control unit 452, an image encoder 453, a camera I/F unit 454, an LCD control unit 455, an image decoder 456, a multiplexing/separating unit 457, a recording/playing unit 462, a modulation/demodulation circuit unit 458, and an audio codec 459. These are mutually connected via a bus 460.

Also, the cellular telephone 400 includes operation keys 419, a CCD (Charge Coupled Devices) camera 416, a liquid crystal display 418, a storage unit 423, a transmission/reception circuit unit 463, an antenna 414, a microphone (mike) 421, and a speaker 417.

Upon a call end and power key being turned on by the user's operation, the power supply circuit unit 451 activates the cellular telephone 400 in an operational state by supplying power to the units from a battery pack.

The cellular telephone 400 performs various operations, such as transmission/reception of an audio signal, transmission/reception of an e-mail and image data, image shooting, data recoding, and so forth, in various modes such as a voice call mode, a data communication mode, and so forth, based on the control of the main control unit 450 made up of a CPU, ROM, RAM, and so forth.

For example, in the voice call mode, the cellular telephone 400 converts the audio signal collected by the microphone (mike) 421 into digital audio data by the audio codec 459, subjects this to spectrum spread processing at the modulation/demodulation circuit unit 458, and subjects this to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (audio signal) transmitted to the base station is supplied to the cellular telephone of the other party via the public telephone network.

Also, for example, in the voice call mode, the cellular telephone 400 amplifies the reception signal received at the antenna 414, at the transmission/reception circuit unit 463, further subjects to frequency conversion processing and analog/digital conversion processing, subjects to spectrum inverse spread processing at the modulation/demodulation circuit unit 458, and converts into an analog audio signal by the audio codec 459. The cellular telephone 400 outputs the converted and obtained analog audio signal thereof from the speaker 417.

Further, for example, in the event of transmitting an e-mail in the data communication mode, the cellular telephone 400 accepts the text data of the e-mail input by the operation of the operation keys 419 at the operation input control unit 452. The cellular telephone 400 processes the text data thereof at the main control unit 450, and displays on the liquid crystal display 418 via the LCD control unit 455 as an image.

Also, the cellular telephone 400 generates e-mail data at the main control unit 450 based on the text data accepted by the operation input control unit 452, the user's instructions, and so forth. The cellular telephone 400 subjects the e-mail data thereof to spectrum spread processing at the modulation/demodulation circuit unit 458, and subjects to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (e-mail) transmitted to the base station is supplied to a predetermined destination via the network, mail server, and so forth.

Also, for example, in the event of receiving an e-mail in the data communication mode, the cellular telephone 400 receives the signal transmitted from the base station via the antenna 414 with the transmission/reception circuit unit 463, amplifies, and further subjects to frequency conversion processing and analog/digital conversion processing. The cellular telephone 400 subjects the reception signal thereof to spectrum inverse spread processing at the modulation/demodulation circuit unit 458 to restore the original e-mail data. The cellular telephone 400 displays the restored e-mail data on the liquid crystal display 418 via the LCD control unit 455.

Note that the cellular telephone 400 may record (store) the received e-mail data in the storage unit 423 via the recording/playing unit 462.

This storage unit 423 is an optional rewritable recording medium. The storage unit 423 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 423 may be other than these.

Further, for example, in the event of transmitting image data in the data communication mode, the cellular telephone 400 generates image data by imaging at the CCD camera 416. The CCD camera 416 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 416 performs compression encoding of the image data at the image encoder 453 via the camera I/F unit 454, and converts into encoded image data by a predetermined encoding format such as MPEG2 or MPEG4 or the like, for example.

The cellular telephone 400 employs the above-mentioned image encoding device 101 as the image encoder 453 for performing such processing. Accordingly, in the same way as with the image encoding device 101, the image encoder 453 can improve encoding efficiency, and improve subjective image quality in decoded images.

Note that, at this time simultaneously, the cellular telephone 400 converts the audio collected at the microphone (mike) 421, while shooting with the CCD camera 416, from analog to digital at the audio codec 459, and further encodes this.

The cellular telephone 400 multiplexes the encoded image data supplied from the image encoder 453, and the digital audio data supplied from the audio codec 459 at the multiplexing/separating unit 457 using a predetermined method. The cellular telephone 400 subjects the multiplexed data obtained as a result thereof to spectrum spread processing at the modulation/demodulation circuit unit 458, and subjects to digital/analog conversion processing and frequency conversion processing at the transmission/reception circuit unit 463. The cellular telephone 400 transmits the signal for transmission obtained by the conversion processing thereof to an unshown base station via the antenna 414. The signal for transmission (image data) transmitted to the base station is supplied to the other party via the network or the like.

Note that in the event that image data is not transmitted, the cellular telephone 400 may also display the image data generated at the CCD camera 416 on the liquid crystal display 418 via the LCD control unit 455 instead of the image encoder 453.

Also, for example, in the event of receiving the data of a moving image file linked to a simple website or the like in the data communication mode, the cellular telephone 400 receives the signal transmitted from the base station at the transmission/reception circuit unit 463 via the antenna 414, amplifies, and further subjects to frequency conversion processing and analog/digital conversion processing. The cellular telephone 400 subjects the received signal to spectrum inverse spread processing at the modulation/demodulation circuit unit 458 to restore the original multiplexed data. The cellular telephone 400 separates the multiplexed data thereof at the multiplexing/separating unit 457 into encoded image data and audio data.

The cellular telephone 400 decodes the encoded image data at the image decoder 456 with a decoding format corresponding to the predetermined encoding format, such as MPEG2 or MPEG4 or the like, thereby generating playing moving image data, and displays this on the liquid crystal display 418 via the LCD control unit 455. Thus, moving image data included in a moving image file linked to a simple website is displayed on the liquid crystal display 418, for example.

The cellular telephone 400 employs the above-mentioned image decoding device 201 as the image decoder 456 for performing such processing. Accordingly, in the same way as with the image decoding device 201, the image decoder 456 can improve encoding efficiency, and improve subjective image quality in decoded images.

At this time, simultaneously, the cellular telephone 400 converts the digital audio data into an analog audio signal at the audio codec 459, and outputs this from the speaker 417. Thus, audio data included in a moving image file linked to a simple website is played, for example.

Note that, in the same way as with the case of e-mail, the cellular telephone 400 may record (store) the received data linked to a simple website or the like in the storage unit 423 via the recording/playing unit 462.

Also, the cellular telephone 400 analyzes the imaged two-dimensional code obtained by the CCD camera 416 at the main control unit 450, whereby information recorded in the two-dimensional code can be obtained.

Further, the cellular telephone 400 can communicate with an external device at the infrared communication unit 481 using infrared rays.

The cellular telephone 400 employs the image encoding device 101 as the image encoder 453, whereby encoding efficiency can be improved. As a result, the cellular telephone 400 can provide encoded data (image data) with good encoding efficiency to another device.

Also, the cellular telephone 400 employs the image decoding device 201 as the image decoder 456, whereby encoding efficiency can be improved. As a result thereof, the cellular telephone 400 can obtain and display higher definition decoded images from a moving image file linked to at a simple website or the like, for example.

Note that description has been made so far wherein the cellular telephone 400 employs the CCD camera 416, but the cellular telephone 400 may employ an image sensor (CMOS image sensor) using CMOS (Complementary Metal Oxide Semiconductor) instead of this CCD camera 416. In this case as well, the cellular telephone 400 can image a subject and generate the image data of an image of the subject in the same way as with the case of employing the CCD camera 416.

Also, description has been made so far regarding the cellular telephone 400, but the image encoding device 101 and the image decoding device 201 may be applied to any kind of device in the same way as with the case of the cellular telephone 400 as long as it is a device having the same imaging function and communication function as those of the cellular telephone 400, for example, such as a PDA (Personal Digital Assistants), smart phone, UMPC (Ultra Mobile Personal Computer), net book, notebook-sized personal computer, or the like.

[Configuration Example of Hard Disk Recorder]

Figure 25:
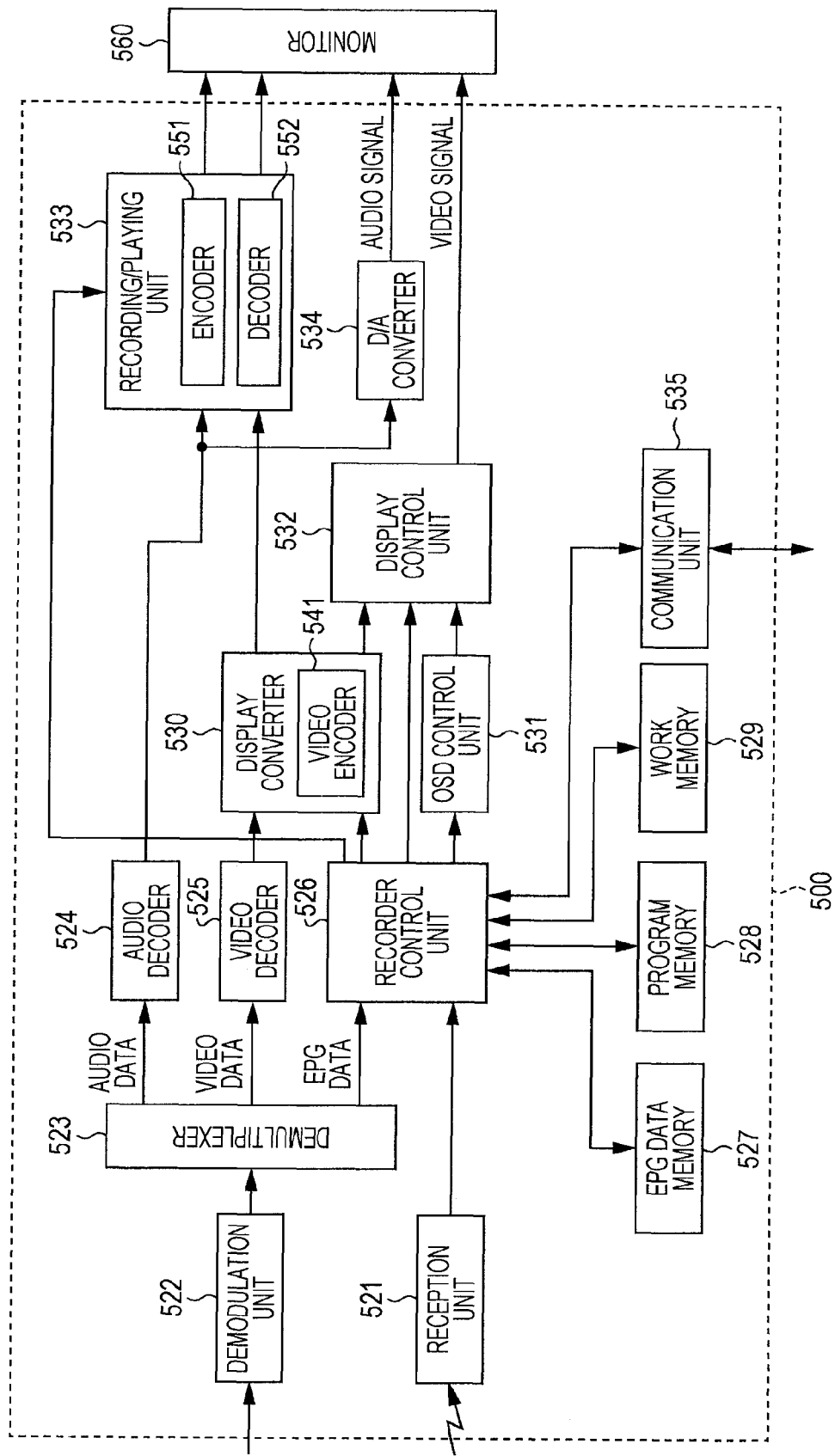
FIG. 25 is a block diagram illustrating a principal configuration example of a hard disk recorder to which the present invention has been applied.

FIG. 25 is a block diagram illustrating a principal configuration example of a hard disk recorder which employs the image encoding device and image decoding device to which the present invention has been applied.

A hard disk recorder (HDD recorder) 500 shown in FIG. 25 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 500 can extract audio data and video data from broadcast wave signals, decode these as appropriate, and store in the built-in hard disk, for example. Also, the hard disk recorder 500 can also obtain audio data and video data from another device via the network, decode these as appropriate, and store in the built-in hard disk, for example.

Further, the hard disk recorder 500 can decode audio data and video data recorded in the built-in hard disk, supply this to a monitor 560, display an image thereof on the screen of the monitor 560, and output audio thereof from the speaker of the monitor 560, for example.

The hard disk recorder 500 can decode audio data and video data extracted from broadcast wave signals obtained via a tuner, or audio data and video data obtained from another device via a network, supply this to the monitor 560, display an image thereof on the screen of the monitor 560, and output audio thereof from the speaker of the monitor 560, for example.

Of course, operations other than these may be performed.

As shown in FIG. 25, the hard disk recorder 500 includes a reception unit 521, a demodulation unit 522, a demultiplexer 523, an audio decoder 524, a video decoder 525, and a recorder control unit 526. The hard disk recorder 500 further includes EPG data memory 527, program memory 528, work memory 529, a display converter 530, an OSD (On Screen Display) control unit 531, a display control unit 532, a recording/playing unit 533, a D/A converter 534, and a communication unit 535.

Also, the display converter 530 includes a video encoder 541. The recording/playing unit 533 includes an encoder 551 and a decoder 552.

The reception unit 521 receives the infrared signal from the remote controller (not shown), converts into an electrical signal, and outputs to the recorder control unit 526. The recorder control unit 526 is configured of, for example, a microprocessor and so forth, and executes various types of processing in accordance with the program stored in the program memory 528. At this time, the recorder control unit 526 uses the work memory 529 according to need.

The communication unit 535, which is connected to the network, performs communication processing with another device via the network. For example, the communication unit 535 is controlled by the recorder control unit 526 to communicate with a tuner (not shown), and to principally output a channel selection control signal to the tuner.

The demodulation unit 522 demodulates the signal supplied from the tuner, and outputs to the demultiplexer 523. The demultiplexer 523 separates the data supplied from the demodulation unit 522 into audio data, video data, and EPG data, and outputs to the audio decoder 524, video decoder 525, and recorder control unit 526, respectively.

The audio decoder 524 decodes the input audio data, for example, with the MPEG format, and outputs to the recording/playing unit 533. The video decoder 525 decodes the input video data, for example, with the MPEG format, and outputs to the display converter 530. The recorder control unit 526 supplies the input EPG data to the EPG data memory 527 for storing.

The display converter 530 encodes the video data supplied from the video decoder 525 or recorder control unit 526 into, for example, the video data conforming to the NTSC (National Television Standards Committee) format using the video encoder 541, and outputs to the recording/playing unit 533. Also, the display converter 530 converts the size of the screen of the video data supplied from the video decoder 525 or recorder control unit 526 into the size corresponding to the size of the monitor 560, converts the video data of which the screen size has been converted into the video data conforming to the NTSC format using the video encoder 541, converts into an analog signal, and outputs to the display control unit 532.

The display control unit 532 superimposes, under the control of the recorder control unit 526, the OSD signal output from the OSD (On Screen Display) control unit 531 on the video signal input from the display converter 530, and outputs to the display of the monitor 560 for displaying.

Also, the audio data output from the audio decoder 524 has been converted into an analog signal using the D/A converter 534, and supplied to the monitor 560. The monitor 560 outputs this audio signal from the built-in speaker.

The recording/playing unit 533 includes a hard disk as a recording medium in which video data, audio data, and so forth are recorded.

The recording/playing unit 533 encodes the audio data supplied from the audio decoder 524 with the MPEG format by the encoder 551. Also, the recording/playing unit 533 encodes the video data supplied from the video encoder 541 of the display converter 530 with the MPEG format by the encoder 551. The recording/playing unit 533 synthesizes the encoded data of the audio data thereof, and the encoded data of the video data thereof using the multiplexer. The recording/playing unit 533 amplifies the synthesized data thereof by channel coding, and writes the data thereof in the hard disk via a recording head.

The recording/playing unit 533 plays the data recorded in the hard disk via a playing head, amplifies, and separates into audio data and video data using the demultiplexer. The recording/playing unit 533 decodes the audio data and video data by the decoder 552 using the MPEG format. The recording/playing unit 533 converts the decoded audio data from digital to analog, and outputs to the speaker of the monitor 560. Also, the recording/playing unit 533 converts the decoded video data from digital to analog, and outputs to the display of the monitor 560.

The recorder control unit 526 reads out the latest EPG data from the EPG data memory 527 based on the user's instructions indicated by the infrared signal from the remote controller which is received via the reception unit 521, and supplies to the OSD control unit 531. The OSD control unit 531 generates image data corresponding to the input EPG data, and outputs to the display control unit 532. The display control unit 532 outputs the video data input from the OSD control unit 531 to the display of the monitor 560 for displaying. Thus, EPG (Electronic Program Guide) is displayed on the display of the monitor 560.

Also, the hard disk recorder 500 can obtain various types of data such as video data, audio data, EPG data, and so forth supplied from another device via the network such as the Internet or the like.

The communication unit 535 is controlled by the recorder control unit 526 to obtain encoded data such as video data, audio data, EPG data, and so forth transmitted from another device via the network, and to supply this to the recorder control unit 526. The recorder control unit 526 supplies the encoded data of the obtained video data and audio data to the recording/playing unit 533, and stores in the hard disk, for example. At this time, the recorder control unit 526 and recording/playing unit 533 may perform processing such as re-encoding or the like according to need.

Also, the recorder control unit 526 decodes the encoded data of the obtained video data and audio data, and supplies the obtained video data to the display converter 530. The display converter 530 processes, in the same way as the video data supplied from the video decoder 525, the video data supplied from the recorder control unit 526, supplies to the monitor 560 via the display control unit 532 for displaying an image thereof.

Alternatively, an arrangement may be made wherein in accordance with this image display, the recorder control unit 526 supplies the decoded audio data to the monitor 560 via the D/A converter 534, and outputs audio thereof from the speaker.

Further, the recorder control unit 526 decodes the encoded data of the obtained EPG data, and supplies the decoded EPG data to the EPG data memory 527.

The hard disk recorder 500 thus configured employs the image decoding device 201 as the video decoder 525, decoder 552, and decoder housed in the recorder control unit 526. Accordingly, in the same way as with the image decoding device 201, the video decoder 525, decoder 552, and decoder housed in the recorder control unit 526 can improve encoding efficiency, and improve subjective image quality in decoded images.

Accordingly, the hard disk recorder 500 can realize increase in processing speed, and also generate higher definition prediction images. As a result thereof, the hard disk recorder 500 can obtain higher definition decoded images encoded data of video data received via the tuner, from encoded data of video data read out from the hard disk of the recording/playing unit 533, and encoded data of video data obtained via the network, and display on the monitor 560, for example.

Also, the hard disk recorder 500 employs the image encoding device 101 as the encoder 551. Accordingly, in the same way as with the case of the image encoding device 101, the encoder 551 can improve encoding efficiency, and improve subjective image quality in decoded images.

Accordingly, the hard disk recorder 500 can realize increase in processing speed, and also improve encoding efficiency of encoded data to be recorded in the hard disk, for example. As a result thereof, the hard disk recorder 500 can more effectively use the storage region of the hard disk.

Note that description has been made so far regarding the hard disk recorder 500 for recording video data and audio data in the hard disk, but it goes without saying that any kind of recording medium may be employed. For example, even with a recorder to which a recording medium other than a hard disk, such as flash memory, optical disc, video tape, or the like, is applied, the image encoding device 101 and image decoding device 201 can be applied thereto in the same way as with the case of the above hard disk recorder 500.

[Configuration Example of Camera]

Figure 26:
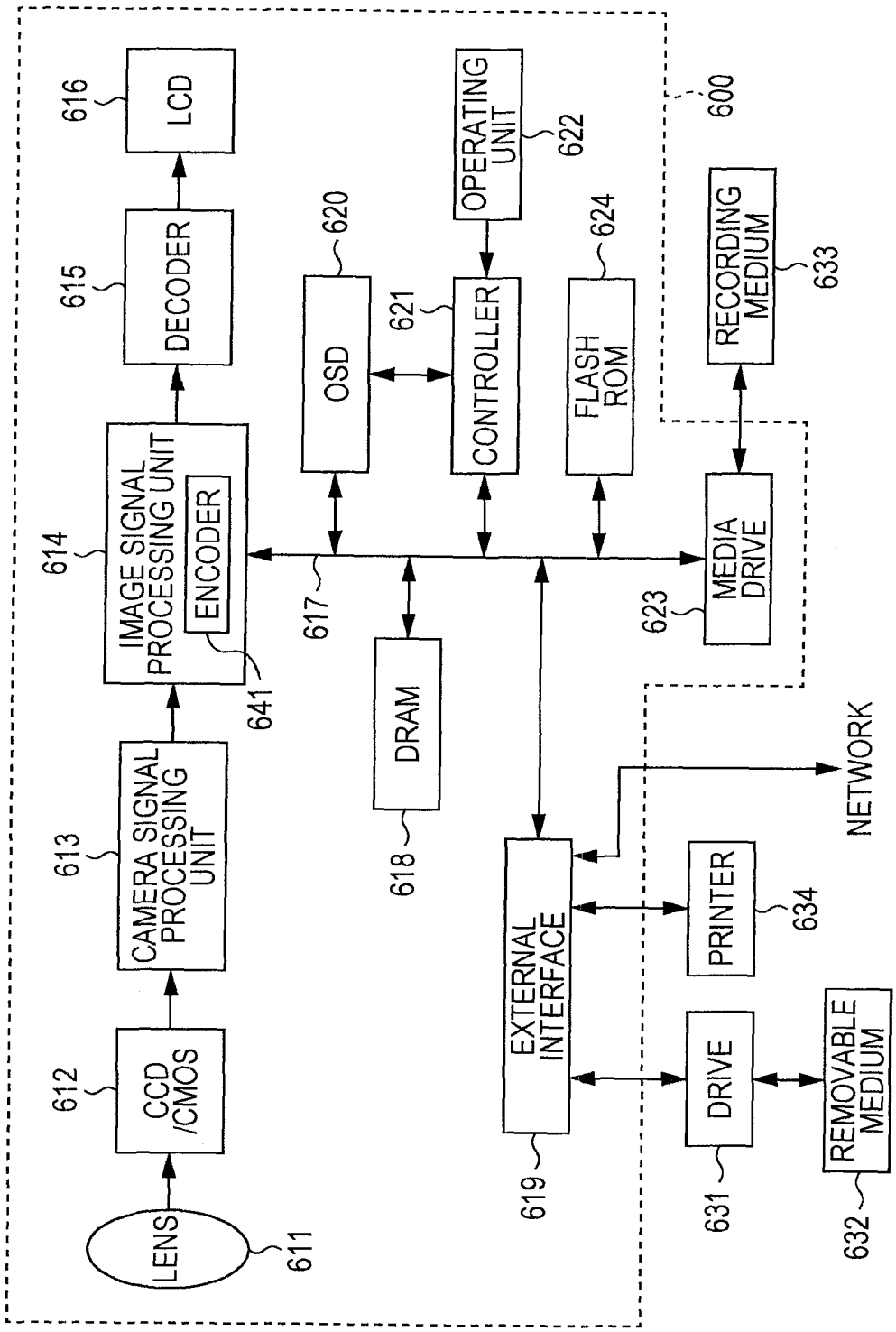
FIG. 26 is a block diagram illustrating a principal configuration example of a camera to which the present invention has been applied.

FIG. 26 is a block diagram illustrating a principal configuration example of a camera employing the image encoding device and image decoding device to which the present invention has been applied.

A camera 600 shown in FIG. 26 images a subject, displays an image of the subject on an LCD 616, and records this in a recording medium 633 as image data.

A lens block 611 inputs light (i.e., picture of a subject) to a CCD/CMOS 612. The CCD/CMOS 612 is an image sensor employing a CCD or CMOS, which converts the intensity of received light into an electrical signal, and supplies to a camera signal processing unit 613.

The camera signal processing unit 613 converts the electrical signal supplied from the CCD/CMOS 612 into color difference signals of Y, Cr, and Cb, and supplies to an image signal processing unit 614. The image signal processing unit 614 subjects, under the control of a controller 621, the image signal supplied from the camera signal processing unit 613 to predetermined image processing, or encodes the image signal thereof by an encoder 641 using the MPEG format for example. The image signal processing unit 614 supplies encoded data generated by encoding an image signal, to a decoder 615. Further, the image signal processing unit 614 obtains data for display generated at an on-screen display (OSD) 620, and supplies this to the decoder 615.

With the above-mentioned processing, the camera signal processing unit 613 appropriately takes advantage of DRAM (Dynamic Random Access Memory) 618 connected via a bus 617 to hold image data, encoded data encoded from the image data thereof, and so forth in the DRAM 618 thereof according to need.

The decoder 615 decodes the encoded data supplied from the image signal processing unit 614, and supplies obtained image data (decoded image data) to the LCD 616. Also, the decoder 615 supplies the data for display supplied from the image signal processing unit 614 to the LCD 616. The LCD 616 synthesizes the image of the decoded image data, and the image of the data for display, supplied from the decoder 615 as appropriate, and displays a synthesizing image thereof.

The on-screen display 620 outputs, under the control of the controller 621, data for display such as a menu screen or icon or the like made up of a symbol, characters, or a figure to the image signal processing unit 614 via the bus 617.

Based on a signal indicating the content commanded by the user using an operating unit 622, the controller 621 executes various types of processing, and also controls the image signal processing unit 614, DRAM 618, external interface 619, on-screen display 620, media drive 623, and so forth via the bus 617. Programs, data, and so forth necessary for the controller 621 executing various types of processing are stored in FLASH ROM 624.

For example, the controller 621 can encode image data stored in the DRAM 618, or decode encoded data stored in the DRAM 618 instead of the image signal processing unit 614 and decoder 615. At this time, the controller 621 may perform encoding/decoding processing using the same format as the encoding/decoding format of the image signal processing unit 614 and decoder 615, or may perform encoding/decoding processing using a format that neither the image signal processing unit 614 nor the decoder 615 can handle.

Also, for example, in the event that start of image printing has been instructed from the operating unit 622, the controller 621 reads out image data from the DRAM 618, and supplies this to a printer 634 connected to the external interface 619 via the bus 617 for printing.

Further, for example, in the event that image recording has been instructed from the operating unit 622, the controller 621 reads out encoded data from the DRAM 618, and supplies this to a recording medium 633 mounted on the media drive 623 via the bus 617 for storing.

The recording medium 633 is an optional readable/writable removable medium, for example, such as a magnetic disk, a magneto-optical disk, an optical disc, semiconductor memory, or the like. It goes without saying that the recording medium 633 is also optional regarding the type of a removable medium, and accordingly may be a tape device, or may be a disc, or may be a memory card. It goes without saying that the recoding medium 633 may be a non-contact IC card or the like.

Alternatively, the media drive 623 and the recording medium 633 may be configured so as to be integrated into a non-transportable recording medium, for example, such as a built-in hard disk drive, SSD (Solid State Drive), or the like.

The external interface 619 is configured of, for example, a USB input/output terminal and so forth, and is connected to the printer 634 in the event of performing printing of an image. Also, a drive 631 is connected to the external interface 619 according to need, on which the removable medium 632 such as a magnetic disk, optical disc, or magneto-optical disk is mounted as appropriate, and a computer program read out therefrom is installed in the FLASH ROM 624 according to need.

Further, the external interface 619 includes a network interface to be connected to a predetermined network such as a LAN, the Internet, or the like. For example, in accordance with the instructions from the operating unit 622, the controller 621 can read out encoded data from the DRAM 618, and supply this from the external interface 619 to another device connected via the network. Also, the controller 621 can obtain, via the external interface 619, encoded data or image data supplied from another device via the network, and hold this in the DRAM 618, or supply this to the image signal processing unit 614.

The camera 600 thus configured employs the image decoding device 201 as the decoder 615. Accordingly, in the same way as with the image decoding device 201, the decoder 615 can improve encoding efficiency, and improve subjective image quality in decoded images.

Accordingly, the camera 600 can generate a prediction image with high precision. As a result thereof, the camera 600 can obtain higher definition decoded images at higher speed from, for example, image data generated at the CCD/CMOS 612, encoded data of video data read out from the DRAM 618 or recording medium 633, and encoded data of video data obtained via a network, and display on the LCD 616.

Also, the camera 600 employs the image encoding device 101 as the encoder 641. Accordingly, in the same way as with the case of the image encoding device 101, the encoder 641 can improve encoding efficiency, and improve subjective image quality in decoded images.

Accordingly, the camera 600 can improve encoding efficiency of encoded data to be recorded in the hard disk, for example. As a result thereof, the camera 600 can more effectively use the storage region of the DRAM 618 or recording medium 633 at higher speed.

Note that the decoding method of the image decoding device 201 may be applied to the decoding processing which the controller 621 performs. In the same way, the encoding method of the image encoding device 101 may be applied to the encoding processing which the controller 621 performs.

Also, the image data which the camera 600 takes may be moving images or may be still images.

As a matter of course, the image encoding device 101 and image decoding device 201 may be applied to devices or systems other than the above-described devices.

REFERENCE SIGNS LIST

16 lossless encoding unit
21 deblocking filter
24 intra prediction unit
42 lossless decoding unit
46 deblocking filter
51 intra prediction unit
101 image encoding device
111 adaptive loop filter
112 edge detecting unit
131 class classification unit
132-1, 132-2 filter coefficient calculating unit
133-1, 133-2 filter processing unit
201 image decoding device
211 adaptive loop filter
212 edge detecting unit
231 filter coefficient buffer
232 class classification unit
233-1, 233-2 filter processing unit

The invention claimed is:

1. An image processing device, comprising:
circuitry configured to:
perform class classification of an image into a smooth region class and an edge or texture class, for each predetermined block, using edge information of said predetermined block as baseband information of pixel values configuring said predetermined block, the edge information indicating edge strength of said predetermined block; and
perform filter processing as to said predetermined blocks subjected to said class classification by said circuitry, using filter coefficients calculated using said predetermined blocks class-classified into same classes, wherein
in the event that the edge strength of said predetermined block exceeds a predetermined threshold value, said circuitry performs class classification of said predetermined block into said edge or texture class,
in the event that the edge strength of said predetermined block does not exceed said predetermined threshold value, said circuitry performs class classification of said predetermined block into said smooth region class, and
said circuitry is configured to set said predetermined threshold value in accordance with a quantization parameter in said predetermined block so that said predetermined threshold value is set lower as said quantization parameter is higher.

2. The image processing device according to claim 1, wherein the edge strength of said predetermined block is calculated using a Sobel operator.

3. The image processing device according to claim 1, wherein said predetermined block is a macro block or a block making up said macro block.

4. The image processing device according to claim 1, wherein
said predetermined block is a macro block or a block making up said macro block, and
said circuitry is configured to set said predetermined threshold value in accordance with whether or not the frame in which said predetermined block is included has been subjected to deblocking filtering.

5. The image processing device according to claim 4, wherein, in the event that said frame in which said predetermined block is included has been subjected to deblocking filtering, said circuitry sets said predetermined threshold value to be a value lower than a case in which said frame has not been subjected to deblocking filtering.

6. The image processing device according to claim 1, wherein said circuitry performs class classification of said image into said smooth region class and said edge or texture class using pixel dispersion values of said predetermined blocks as said baseband information, for each of said predetermined blocks.

7. The image processing device according to claim 6, wherein,
in the event that the pixel dispersion value of said predetermined block exceeds a second predetermined threshold value, said circuitry performs class classification of said predetermined block into said edge or texture class, and
in the event that the pixel dispersion value of said predetermined block does not exceed said second predetermined threshold value, said circuitry performs class classification into said smooth region class.

8. The image processing device according to claim 7, wherein
said predetermined block is a macro block or a block making up said macro block, and
said circuitry is configured to set said predetermined threshold value in accordance with whether or not said frame in which said block is included has been subjected to deblocking filtering.

9. The image processing device according to claim 8, wherein, in the event that said frame has been subjected to deblocking filtering, said circuitry sets said predetermined threshold value to be a value lower than a case in which said frame has not been subjected to deblocking filtering.

10. The image processing device according to claim 1, wherein said circuitry is configured to transmit a bit stream of said image, and said filter coefficients.

11. The image processing device according to claim 1, wherein said circuitry is configured to receive a bit stream of said image, and said filter coefficients.

12. The image processing device according to claim 1, wherein said circuitry is configured to control said quantization parameter so as not to cause overflow or underflow of data of the image in a storage buffer of the image processing device.

13. An image processing method of an image processing device including circuitry, the image processing method comprising:

performing class classification of an image into a smooth region class and an edge or texture class, for each predetermined block, using edge information of said predetermined block as baseband information of pixel values configuring said predetermined block, the edge information indicating edge strength of said predetermined block, performing filter processing as to said predetermined blocks subjected to said class classification, using filter coefficients calculated using said predetermined blocks class-classified into same classes, in the event that the edge strength of said predetermined block exceeds a predetermined threshold value, performing class classification of said predetermined block into said edge or texture class, in the event that the edge strength of said predetermined block does not exceed said predetermined threshold value, performing class classification of said predetermined block into said smooth region class, and setting said predetermined threshold value in accordance with a quantization parameter in said predetermined block so that said predetermined threshold value is set lower as said quantization parameter is higher.

* * * * *